United States Patent [19]

Krawczyk et al.

[11] Patent Number: 5,505,982
[45] Date of Patent: Apr. 9, 1996

[54] CHOCOLATE CONFECTION

[75] Inventors: Gregory R. Krawczyk, Princeton Junction, N.J.; Edward Selinger, Langhorne; Emanuel J. McGinley, Morrisville, both of Pa.

[73] Assignee: FMC Corporation, Philadelphia, Pa.

[21] Appl. No.: 379,047

[22] Filed: Jan. 27, 1995

Related U.S. Application Data

[63] Continuation-in-part of Ser. No. 188,513, Jan. 28, 1994, Pat. No. 5,441,753.

[51] Int. Cl.$^6$ ............................. A23L 1/0534; A23L 1/308
[52] U.S. Cl. ............................. 426/660; 426/804; 426/99
[58] Field of Search ............................. 426/660, 548, 426/804, 99, 613

[56] References Cited

U.S. PATENT DOCUMENTS

| | | | |
|---|---|---|---|
| 3,023,104 | 2/1962 | Battista | 99/1 |
| 3,067,037 | 12/1962 | Herald et al. | 99/139 |
| 3,539,365 | 11/1970 | Durand et al. | 106/197 |
| 3,573,058 | 3/1971 | Tiemstra et al. | 99/1 |
| 4,109,018 | 8/1978 | Thompson | 426/62 |
| 4,143,163 | 3/1979 | Hutchison et al. | 426/96 |
| 4,156,021 | 5/1979 | Richardson | 426/104 |
| 4,219,580 | 8/1980 | Torres | 426/549 |
| 4,232,052 | 11/1980 | Nappen | 426/601 |
| 4,374,702 | 2/1983 | Turbak et al. | 162/100 |
| 4,748,027 | 5/1988 | Schou et al. | 426/96 |
| 4,810,516 | 3/1989 | Kong-Chan | 426/548 |
| 4,814,195 | 3/1989 | Yokoyama | 426/633 |
| 4,911,946 | 3/1990 | Singer et al. | 426/658 |
| 4,923,981 | 4/1990 | Weibel et al. | 426/602 |
| 5,011,701 | 4/1991 | Baer et al. | 426/573 |
| 5,026,569 | 6/1991 | Forand | 426/549 |
| 5,132,128 | 7/1992 | Rockland | 426/658 |
| 5,158,798 | 10/1992 | Fung et al. | 426/602 |
| 5,192,569 | 3/1993 | McGinley et al. | 426/96 |
| 5,209,942 | 5/1993 | Bauer et al. | 426/573 |
| 5,356,644 | 10/1994 | Hendrick et al. | 420/99 |
| 5,366,742 | 11/1994 | Tuason, Jr. et al. | 420/96 |

OTHER PUBLICATIONS

CRC Handbook of Food Additives; Furia, Thomas E.; 1972; vol. I, Second Edition pp. 320–413.
Table VIII–Critical Micelle Concentrations and Micellar Aggregation Numbers of Various Surfactants In Water At Room Temperature; Remington's Pharmaceutical Sciences; 1990; Chapter 19, pp. 270–271. Disperse Systems Chapter.
Food Chemicals Codex; National Academy Press; 1981; Third Edition; pp. 78–81, 98–99, 289, 300–301 and 307.
Emulsifiers In Modern Food Production; Flack, Eric and Krog, Niels; Jan. 1990; Lipid Technology, vol. 2 No. 1; pp. 11–13.
Handbook of Food, Drug, and Cosmetic Excipients; Smolinske, Susan C.; 1992; pp. 295–296.
Interaction Between Surface Active Substances and Pulp Fibers; Friberg, Stig, Bruun, Henrik H. and Enqvist, Reinhold; 1975; Svensk Papperstidning, mr 14, 1975; pp. 518–522.
McCutcheon's Emulsifiers & Detergents; McCutcheon Division, MC Publishing Co.; 1987; North American Edition; pp. 1–14.
Novagel Cellulose Gel Fat Replacer; FMC Corporation; 1992; pp. 1–5.
Phospholipids andlFatty Acid Esters of Alcohols; St. Angelo, Allen J. and Vercellotti, John R.
Physical Chemistry of Foods; edited by Schwartzberg, Henry G. and Hartel, Richard; IFT Basic Symposium Series; Marcel Dekker, Inc.; 1992; 361–367.
Remington's Pharmaceutical Reference Book; Polysorbates; Chapter 66; p. 1314.
Principles of Food Science; Edited by Fennema, Owen R.; Food Chemistry, Part 1; Marcel Dekker, Inc.; 1976; pp. 559–566.
Surfactants and Interfacial Phenomena; Rosen, Milton J.; Relationship of Surfactant Chemical Structure to Emulsifying Behavior; 1978; pp. 241–293.
Handbook of Food Additives; Surface Active Agents; Griffin, William C. and Lynch, Matthew J.; Chapter 9; pp. 398–429.
The Rate of Wetting of Textiles by Detergent Systems; Durham K. and Camp, M.; Solid/Liquid Interface (Washings, etc.) and Cell/Water Interface; 1957;pp. 3–11.

Primary Examiner—Jeanette Hunter
Attorney, Agent, or Firm—Anthony L. Cupoli; Polly E. Ramstad; Robert L. Andersen

[57] ABSTRACT

A chocolate that contains a composite of surfactant/cellulose. The composite is made by the process of coprocessing the cellulose with a surfactant. The composite can be used as a bulking agent or functional formulary aid in low-moisture or in fat phase compositions.

8 Claims, No Drawings

5,505,982

1

CHOCOLATE CONFECTION

This is a continuation-in-part application of prior application Ser. No. 08/188,513 filed on Jan. 28, 1994 now U.S. Pat. No. 5,441,753.

FIELD OF THE INVENTION

This invention relates to new functional bulking and texturizing materials used as an ingredient in chocolate. More particularly, the invention relates to an improved chocolate containing a particulate coprocessed cellulose.

BACKGROUND OF THE INVENTION

In this era of calorie consciousness in which many consumers are interested in reducing their calorie intake, particularly their fat intake, without reducing their food consumption, there is a need for reduced calorie food ingredients that provide bulk, but few, if any, calories. These bulking aids can be incorporated into specific foods to replace or otherwise reduce the amount of fat and/or other calorie source that would normally have been present in the food. Typically, although not always, these bulking aids preserve the texture of the food and the mouthfeel of the food and preferably enhance either the functionality of other food ingredients or the efficiency of the process of forming the foods.

Cellulose is one such material that has historically served as a functional formulary aid in a wide range of food applications. The use of cellulose as a non-nutritive bulking agent in food systems, especially in nonaqueous food systems, is limited by several characteristics of cellulose. These include an inherent chalky or other disagreeable taste, especially at high use levels; difficulty in forming a dispersion, which adversely affects its mouth feel; and an adverse affect on texture or consistency.

The traditional approach to overcoming these limitations has been to coat the particulate cellulose with carboxymethyl cellulose, with a gum such as guar gum, or with some other hydrocolloid. Such coatings work with various degrees of effectiveness in aqueous systems; however, they do not tend to work well in systems containing little or no water.

This invention is directed to a novel particulate cellulose composite that is dispersible in a low moisture or in a non-aqueous system, such as chocolate. The composite can be designed, if desired, to provide good texture and/or to avoid the chalky taste of cellulose. It can serve as a bulking agent or it can be used to provide functionality

SUMMARY

The present invention is directed to a chocolate containing as an ingredient a composite of a particulate cellulose and one or more surfactant(s) in which the surfactant is adsorbed onto the surface of the cellulose, which composite has surfactant(s) with an HLB within the range of from 1 to 40. This composite can be made by coprocessing a particulate cellulose with a surfactant.

DETAILED DESCRIPTION OF THE PREFERRED EMBODIMENTS

The term "cellulose" denotes a particulate cellulose that has not been coprocessed with a hydrocolloid or with a surfactant. Such a particulate cellulose includes microcrystalline cellulose (MCC), such as Avicel® microcrystalline cellulose, a product of the FMC Corporation; a cellulose powder, such as Solkafloc® cellulose powder, a product of the Fiber Sales and Development Corporation, a subsidiary of Protein Technologies; a fibrillated cellulose, a fibrillated microcrystalline cellulose, an attrited microcrystalline cellulose, an attrited fibrillated cellulose, and any other particulate cellulose or microcrystalline cellulose. Any cellulose source can be used. These sources include wood pulp, non-woody plant sources such as wheat fiber, soy fiber, cane, bagasse, sugar beet, cocoa, oats, and the like. The starting particle size may range from 1.0 to 500 micrometers (microns; µ), with a preferred range of 1 to 50µ for most cellulose, and a most preferred range of from 1 to 20µ. The shape of the particles may be round or spherical, rod-like, platelet shaped, or irregular. The preferred particle size and shape are determined by the particular end use, and the general considerations operative in such a selection are known in the art.

The term "surfactant" denotes a chemical compound with a calculable HLB (hydrophilic/lipophilic balance) within the range of from 1 to about 40. A surfactant has at least two types of moieties, a hydrophilic moiety and a hydrophobic moiety. Although HLB was developed as a means for categorizing emulsifiers according to their tendency to form emulsions containing oil and water, the HLB system has been and here is applied to surfactants. Generally, the lower the HLB the greater the tendency is for the surfactant to dissolve in oil, and the higher the HLB the greater the tendency is for the surfactant to dissolve in water. A low HLB surfactant has an HLB of about 2 to 8 and is usually oil soluble or at least oil dispersible. A high HLB surfactant has an HLB of about 13 or greater and is usually water soluble or at least water dispersible. Intermediate HLB surfactants have intermediate tendencies. This system, which was developed by Griffin at ICI America, is now a widely accepted empirically derived standard that is used to help select alternative surfactants based on the HLB of the surfactant being used. It is also used to select groups of surfactants which individually may not have the desired HLB, but collectively have a net HLB within the needed range.

The term "surfactant" as used herein does not include any hydrocolloid. Hydrocolloids are naturally occurring colloidal products, typically gums such as carboxymethyl cellulose(cmc), carageenan, pectin, agar, konjac, and gelatin, which have hydrophilic moieties, but not hydrophobic moieties. Hydrocolloids are sometimes used as protective colloids or as stabilizers for emulsions and suspensions. Some have also been processed with cellulose. Hydrocolloids are not, however, considered to be surfactants within the context of this invention.

The term "low moisture" denotes a moisture content of no more than 30% by weight generally, and may denote a lower moisture content if so specified herein.

The term "mid-range moisture" denotes a moisture content within the range of greater than 30 weight percent up to but no more than 40 weight percent.

The term "high moisture" denotes a moisture content greater than 40 weight percent.

This invention is directed to a novel cellulose composite, and to methods for its preparation and use. The novel composite is the product of a cellulose that has been coprocessed with surfactant. This composite is characterized in that its surface properties have been modified to customize its hydrophobic or hydrophilic characteristics, as required by its desired end use properties. Other end use properties that can be controlled include the degree of dispensability and the potential use levels, especially in low-water or hydrophobic systems, and the masking of the "chalky" taste sometimes found in cellulosics at high use levels. Generally, the composite has a size within the range of from about 1 to about 505μ; preferably it has a size within the range of from about 1 to about 55μ; and most preferably, it has a size within the range of from about 1 to about 25μ.

For the composite of this invention, a surfactant having an HLB within the range of from 1 to 40 is preferred, an HLB of 1 to 10 is more preferred; an HLB of 1 to 8 is even more preferred, and an HLB of 2 to 7 is most preferred. HLB in this context includes not only the HLB of a single surfactant, but the effective, net HLB of a combination of surfactants. The HLB of the composite is essentially the same as the HLB of the surfactant or surfactants used to make it. Examples of materials suitable in the broad aspect of this invention may be found in McCutcheon's Emulsifiers and Detergents. For the food uses, contemplated herein suitable surfactants are listed in the Food Grade section of McCutcheon's. These include but are not limited to food-grade lecithin, fractionated lecithin, monoglycerides and diglycerides; esters of monoglycerides and diglycerides with acetyl, lactyl, ethoxyl, succinyl, ricinoleic, or diacetyltartaric groups; polyglycerol esters, propylene glycol esters, sorbitan esters, and sucrose esters. Fats, oils, proteins, other lipid materials, and blends of the above are also included to the extent they are generally recognized as safe for such use by the appropriate regulatory authority. Such recognition may vary with venue.

Some of the food grade surfactants listed in McCutcheon's are provided by their trade name, common name, manufacturer, ionic character, HLB, and use as follows: Alcolec 628G Lecithin/coconut oil nonionic; Aldo® DC fractionated ester, a product of Lonza Inc., nonionic (HLB 2.0) emulsifiers used in baking, ice creams, and general use in foods; Aldo®MOD FG, glycerol mono/dioleate dispersible nonionic (HLB=4.0); Aldosperse®O-20 FG, 20% Polysorbate 80/80% glycerol monostearate, nonionic (HLB=5.0) a frozen desert emulsifier; Capmul GMVS-K glyceryl mono shortening, a product of Capital City Products, nonionic (HLB=3.4), shortenings for cakes and icings, margarine, whipped topping; Caprol 2G4S diglycerol tetrastearate, a product of Capital City Products, nonionic (HLB=2.5); Caprol 3GS Triglycero 1 monooleate, a product of Capital City Products, nonionic (HLB=6.2) a whipping agent, stabilizer, frozen desserts, fat reduction; Caprol 3GVS Triglycerol mono shortening, a product of Capital City Products nonionic (HLB=6.0) icings, shortenings; Cetodan acetylated monoglycerides, a product of Grinsted Products, nonionic (HLB=1.5) food emulsifier, aerating agent for shortenings, toppings, cakes, edible coating, plasticizer for chewing gum base, antifoam agent, lubricant; Dimodan Distilled monoglycerides, a product of Grinsted Products, nonionic (HLB=3.8–5.3) food emulsifier for starch complexing, margarine, icings, shortenings, whipped toppings, vegetable, dairy systems, bakery hydrates, peanut butter, stabilizer, instant potatoes; Dur-Em®mono and diglycerides with citric acid, a product of Durkee Industrial Foods, nonionic (HLB=3.3) frozen desserts, caramels, dried potatoes; Famodan® Sorbitan esters of fatty acids, a product of Grinsted Products, nonionic (HLB=2.3–7.7) food emulsifiers for fat crystal modification and bloom retarders; Ice™NO.2 blend of vegetable fat derived mono- and diglycerides with polysorbate 80, a product of Durkee Industrial Foods, nonionic (HLB=5.4) ice cream, milk, mellorine, frozen desserts; Panodan Diacetyl tartaric acid esters of monoglycerides, a product of Grinsted Products, anionic (HLB=8.0) food emulsifiers for baked products and mixes to improve structure, volume, dough tolerance, shortenings, low pH emulsions, improve food suspensions, imparts freeze/thaw stability; Span 60, Sorbitan monostearate, a product of ICI Americas, nonionic (HLB=4.7) cake and cake mixes, icings, fillings, confectionery coatings and cocoa products to retain gloss, coffee whiteners, whipped toppings, flavors, antifoam, mineral oil; or wax protective coatings for fruits and vegetables, rehydration aid for dry yeast; Tween 80 POE(20) sorbitan monooleate, a product of ICI Americas, nonionic, (HLB=15) emulsifier for icings and fillings, whipped toppings, shortenings, dietary supplements, flavors, gelatin desserts, poultry defeathering scald water, antifoam, crystallizing aid for salt; Acidan citric acid ester of monoglycerides, a product of Grinsted Products, anionic, (HLB=11.0) for frying margarine and meat emulsions; Aldosperse® MS-20 FG a POE 20 glycerol monostearate, a product of Lonza Inc., nonionic (HLB=13.0) used as a bakery and general food emulsifier; Capmul EMG, an ethoxylated GMS, a product of Capital City Products Co., nonionic (HLB=13.1 ), used as a dough conditioner for yeast-raised baked goods; Capmul POEL polyoxyethylene (20) sorbitan monolaurate (polysorbate 20), a product of Capital City Products Co., nonionic (HLB=16.7) used as a solubilizer for flavors; Capmul POE-S polyoxyethylene (20) sorbitan monostearate (polysorbate 60), a product of Capital City Products Co., nonionic, (HLB=14.9) used in icings, frozen desserts, whipped toppings, and coatings; Clearate WDF soya lecithin, a product of W. A. Cleary Corp, nonionic (HLB=8.0) used in icings, cakes, and instant cocoa.

An effective percentage of surfactant for the composite is about 1% to 50% by weight of the composite. The amount of surfactant required has been found to vary somewhat with surfactant, with 5–10 wt % being required in some situations, with a lower surfactant percentage being effective in others, and with higher surfactant percentages being better in still other situations. Below 1% of surfactant there is insufficient surfactant to satisfactorily modify the surface properties of the cellulose. As the percentage of surfactant increases, the surface of the composite increasingly tends to approach the properties of the surfactant. The optimum surfactant percentage can be determined without undue experimentation; it changes with the particle size, the surfactant used, and the nature of the system the composite is to be used in are considered. At high surfactant percentages, the properties of the surfactant can begin to dominate or become more dominant, especially if the particle size is large. As the particle size decreases, the amount of surfactant required to provide satisfactory masking of the undesirable inherent properties of the cellulose increases. Thus, a 500 micron particle can be satisfactorily coated with 1% surfactant, whereas a 1 micron particle requires a higher percentage of surfactant to adequately cover the surface. As the particle size increases, adding the same percentage of surfactant as required for the small particle size results in the needless addition of unwanted calories found in the surfactant. Thus the preferred percentage of surfactant is within the range of 1 wt % to 50 wt %, and a more preferred percentage of surfactant is within the range of 3% to 30% of the total, an even more preferred percentage of surfactant is within the range of 3 wt % to 20 wt %; and a most preferred percentage of surfactant is within the range of 5 to 15 wt %.

Coprocessing is accomplished by any of several physical processes. These include coprocessing a mixture of a cellulose with an emulsion, a suspension, or a solution of surfactant. Suitable processes, alone or in combination, include intensive co-milling of cellulose and surfactant, either wet or dry using a bead mill, such as a Dynomill, or a mechanofusion processor; high-intensity mixing using a Henschel, a Littleford-Day or other suitable mixer; spray-drying; bulk co-drying using a fluid bed dryer or some other suitable dryer; fluid bed drying or agglomerating using a Glatt dryer or other suitable dryer; air drying; freeze drying using a Stork dryer or other suitable dryer; or spray chilling of emulsified, or suspended cellulose and surfactant using a Niro or other suitable spray chiller; or by coextrusion of the cellulose and the surfactant, using any one of a number of commercially available extruders. When wet-processed, the liquid may be water, a nonaqueous solvent such as alcohol, or a mixture thereof. Agents that improve the compatibility of the components may also be used in any of the above processes. A preferred process includes high-intensity mixing in an aqueous solution followed by either co-spray drying, or high-intensity, dry co-milling.

Coprocessing is required. The simple blending of cellulose and surfactant is not sufficient to produce the novel composites of this invention. To form such a composite, the surfactant must be free to flow onto the surface of the cellulose. Such flow can occur near, at, or above the melting temperature of the surfactant or it can occur if the surfactant is in solution or if the surfactant is dispersed or emulsified. A typical process used for making the composites of this invention involves a high shear with a temperature that is sufficient to melt, to soften, or to otherwise improve the flow characteristics of the surfactant. The intensity must be sufficient to force association between the hydrophilic surface of the starting cellulose, and at least the less hydrophobic part of the surfactant molecule, requiring a significant energy input, either mechanically or through a solvent system. As a general rule, the more uniform the distribution of surfactant is throughout the surfactant/cellulose system being coprocessed, the better the composite. Absent such a distribution, the surfactant will tend to aggregate particles of surfactant rather than coat individual particles. A high degree of surfactant distribution leads to a more effective use of the surfactant on the cellulose and it leads to a more uniform composite particle size distribution. A more uniform composite particle size distribution provides greater quality control in the food or other end product for the composite. Thus, the finer the surfactant dispersion or the greater the degree of emulsion in the coprocessing, the better the product will be. Coprocessing creates a physical interaction between the cellulose particle and the surfactant; however, it is hypothesized that it generally does not tend to create covalent chemical bonding.

It is critical to the invention that the resulting composite be substantially dried before use. Generally the composite has a maximum moisture content of less than about 10 wt %, preferably less than about wt 6%, and most preferably in the range of 2–5 wt %. The drying process fixes the surfactant onto the surface of the cellulose in a manner that tends to prevent, or at least retard, its being stripped from the surface of the cellulose by solvent.

The resulting dry composite is a free-flowing powder that may be added directly to a final-use system, such as, but not limited to, a food product. Since the composite can be added as a dry powder, the mere use of such a composite will not appreciably increase the moisture content of the food to which it is being added. Thus, the composite can be used in foods having extremely low moisture requirements, such as fat phase confections and cookie fillings.

The food in this low moisture category is generally non-aqueous; and is typically high in fat content. This is particularly true of the chocolate, the peanut butter, the nougat, the cookie filling, the confectionery filling, the icing, and the extruded snack. Some of the products in this category have less than 5 wt % moisture, other have less than 15 wt % moisture, and others may have up to 30% water; however, in most cases, most of this water is bound water that is not available to disperse the composite. Available water is a term which describes not the absolute amount of water contained in a product, but rather the amount of water in the product that is not chemically bound. Examples 1 through 10 particularly exemplify the low moisture foods.

The composite can also be used in a mid-range or in a high moisture food, such as a pudding, a bread, a cake, a syrup phase confection, a margarine, a salad dressing, a non-dairy creamer, a mellorine, or a whipped dessert. A few of these specific foods may be prepared with less than 30 weight percent water, in which case, they would be a low moisture food. Examples 11 through 24 exemplify these higher moisture foods.

The composite of this invention is a cellulose, the surface of which has been physically modified by a surfactant, with the composite assuming some of the surface properties characteristic of the surfactant. For example, on the one hand, a cellulose coprocessed with a lipophilic surfactant has a hydrophobic character, easily dispersing in oil, but floating in water without dispersing; while, on the other hand, a neat cellulose clumps, rather than disperses without dispersing in an oil, while a neat cellulose disperses in water with instantaneous settling. This novel surface characteristic of the coprocessed material is maintained even after it has been washed in water. This would not be expected if the composite were merely a simple mixture. It is obtained because the composite is not a simple mixture, but a cellulose having the surfactant affixed thereto. Because the surface of the composite is hydrophobic, it tends not to adsorb or absorb water. Thus, the composite can be used in systems that have a low moisture level, whether or not it is a high oil content.

Using the guidelines described herein, a composite can be prepared which effectively masks the objectionable chalky taste and mouthfeel of cellulose, such as microcrystalline cellulose. Thus, a ooprocessed cellulose dispersed in a food, will not exhibit a chalky mouthfeel even when used in high concentrations. This is true despite the opportunity, during the sometimes extended processing of the food, for the surfactant and cellulose to become separated by dissolution of the surfactant in the food, or otherwise. In contrast, a unmodified cellulose added to a similar food composition still has the chalky taste and the other properties of neat cellulose.

The primary use of the composite as a low calorie bulking agent or as a texturizer. In general, any limited moisture level food system which has limited moisture, including any food with a significant level of lipid in its formula may potentially be improved by using the composite to lower its fat and/or its caloric content, or to alter its rheology or its texture. The composite can be incorporated into a number of low moisture, including nonaqueous, food systems, including: peanut butter, other high fat nut pastes; confectionery spreads including cookie and wafer spreads (such as Oreo-type cookies); chocolate and other compound confectionery coatings; confectionery fillings such as nougat, caramel, truffle, fudge, etc.; confectionery icings and glazes and bakery icings and glazes; bakery creme fillings and snack spreads and fillings; and the like, with favorable results. Depending on the particular end use 1 to 35 weight percent composite can be used. One to 20 wt % is preferred, while 1 to 10 wt % is most preferred. The percentage used will be a function of either the amount of fat to be replaced in the food or the use of other bulking agents in conjunction with it. The usage level will be lower in those instances where the composite is used in conjunction with other bulking agents or the composite is used as a bulking agent in a food that has a low fat content to begin with. The usage level will be higher where the composite is the sole bulking agent or texturizer. Similarly, a composite made with a surfactant having an appropriately selected HLB can be incorporated into mid-range or high moisture food systems within this same specified usage range.

Industrial and other non-food uses are also contemplated. Potential uses are most especially those in which moisture is limited and fat, lipid or surfactant are important components. These uses include, but are not limited to: lotions, ointments, lanolin products, cosmetic facial creams, lipstick, mascara, and dry pharmaceutical applications such as a tablet, a capsule filling, and spheronized materials for drug delivery systems. The ability to act as a finely-dispersible source of surfactant can be important in such systems. Hard waxy emulsifiers were found to be readily dispersible in oil after being coprocessed with cellulose, while solid particulate emulsifiers were very difficult to disperse in oil. Formation of dispersible surfactant ingredients by coprocessing with cellulose is another aspect of the present invention.

Other uses are suggested by the list of surfactants reported in McCutcheon's, since the composite has many of the characteristics of the surfactant it is made of. Thus, the uses accorded the emulsifier is potentially a use for the composite.

Because the ratio of surfactant to cellulose in the composite is variable within broad limits, by tailoring the HLB and composition of the surfactant portion of the mixture, and by choosing the particle size of the cellulose component, compatibility with particular systems can be optimized for any contemplated end use. This tailoring can be accomplished without undue experimentation simply by choosing surfactants and particle sizes otherwise known to be effective in the particular system. Such procedures are known in the art. For example, methods of selecting surfactants, and some suggestions for certain food systems, can be found at p. 404 in the "CRC Handbook of Food Additives" (T E Furia, ed.; second edition, volume I; CRC Press, Cleveland; 1972). HLB is described by Rosen ("Surfactants and Interfacial Phenomena," Wiley, NY, 1978; p. 241–49). Flack and Krog (Lipid Tech. 2 p 11–13, 1990) describe selection of emulsifiers. A list of suitable emulsifiers, and suggestions for their use in particular foods, can be found in industry listings, such as McCutcheon's Emulsifiers and Detergents (MC Publishing, Glen Rock, N.J.).

All suitable coprocessing methods result in the formation of a surfactant layer over at least part of the cellulose particle's surface. This layer, which may be either a continuous or a discontinuous layer, is sufficient to modify the general surface characteristics of the cellulose particle, and is generally lipophilic for low HLB surfactants and hydrophilic for high HLB surfactants. As a result, the composite bulking agent, consisting of the coprocessed cellulose and surfactant, can be designed to be easily dispersed into systems of low moisture and/or high oil content, or they can be designed to be readily compatible with mid-range and high moisture systems. The coprocessed material is very flexible, in that the HLB of the coprocessed material can be adjusted during its manufacture to have a HLB suitable for a particular use, simply by selecting the HLB or other properties of the surfactant used. The coprocessing step may also be used to modify or to tailor the composite functionality in food by controlling the particle size, the particle size distribution, the particle shape, and the ingredients used.

Compared to cellulose alone or to a cellulose and a surfactant added separately to a food system, the coprocessed material improves the taste of the finished food by a reduction or an absence of the well-known dryness or astringency which is inherent in cellulosic materials under low-moisture conditions. This allows the use of cellulose as a bulking agent in materials where it is desirable but was previously not acceptable, and especially allows the use of higher levels of cellulose. Thus, while prior-art cellulose can be objectionable above a few percent in low-moisture systems, the coprocessed composition of the invention can be used at levels of 10 to 20% when the appropriate surfactant is selected.

In addition, the composite can make a significant improvement in the texture of the food, especially in the mouthfeel and melting properties of the food. The composite can also cause an improvement in the viscosity or processability of the finished food in manufacturing, which may be described as an improvement in the rheology of the finished food. For example in chocolate the composite can significantly reduce the viscosity of the chocolate despite the addition of higher levels of solids, thereby improving the coating properties of the chocolate, without affecting its taste or mouthfeel.

The inventive coprocessed material, if made from an appropriate HLB level surfactant, readily disperses in an oil continuous food such as a fat phase confection like chocolate, and in low moisture food such as a peanut butter. In contrast, the unprocessed cellulose alone, and often the surfactant itself, may be poorly dispersible in such systems. The coprocessed material further provides an improvement in the compatibility of the cellulose with certain non-aqueous food systems, such as fat phase confections.

Furthermore, the coprocessed material provides functionality for non-aqueous food systems. In chocolate, for example, the coprocessed material has an effect on viscosity, yield point, and taste.

Chocolate is a dispersion of predominantly sugar and cocoa particles in fat. Reduction of fat content has a profound effect on the rheology, and sensory attributes of chocolate. The rheology of this non-Newtonian system depends mainly on fat content, and the particle size distribution of dispersed solids, (the average particle size being within the range of 18–23 microns), emulsifier type, and quantity.

Coprocessed material, when tailored to provide hydrophobic surface characteristics is very compatible with chocolate, beneficially has minimal caloric value, and evidences a significant reduction in the chalkiness and dryness of native microcrystalline cellulose.

Although any food grade surfactant that can render the surface of the coprocessed material, the composite, hydrophobic is appropriate for chocolate, the following surfactants were found to be especially useful: polyglycerol polyricinoleate; synthetic lecithin; mono and diglycerides; distilled monoglycerides; phosphated, lactylated, succinylated, and acetylated mono, diglycerides; propylene glycol esters; sucrose esters; sorbitan monostearate, monooleate, and tristearate; and polyoxyethylene sorbitan monostearate.

Chocolate can be prepared in a number of ways. One method, is to first mix chocolate liquor, sugar, a portion of cocoa butter, and the composite of coprocessed microcrystalline cellulose/emulsifier. The dough mass is refined, preferably, immediately, to reduce the average particle size to a relatively uniform size. Conching was done by a batch process in a C. W. Brabender Prep Center® unit. Conching was also done in two Teledyne Readco continuous processors set in series. Conching refers to the rheological modification of chocolate which reduces the viscosity by the addition of fat and by high shear mixing. For evaluation purposes, the finished chocolate was tempered and molded in solid bars. The tempering stage is a process which sets the cocoa butter crystals into their most stable form. The molded chocolate was then evaluated for rheological and sensory properties. The above described procedures relating to chocolate can be varied.

The rheological properties of the chocolate, yield value and viscosity, were measured using a Rheometrics® RFS rheometer, using oscillatory dynamic mechanical measurements. Because chocolate exhibits a non-Newtonian flow they were also measured on a rotational Fann® rheometer and the calculation of Casson plastic viscosity and yield value were made using Haake VT-500 software, which exhibited an excellent correlation (R=0.99–1.0).

Addition of the composite enabled a significant reduction in fat content of chocolate. Although the fat content of chocolate varies by type, taste preference, and use, a typical dark chocolate contains about 32–33 percent fat, although other chocolates, such as reverse phase chocolates, generally contain from 0.5 to 32 weight percent fat, and some premium chocolate confections, such as chocolate truffles, can contain as much as 50% fat.

Using the composite, the fat content can be significantly reduced. For example a typical dark chocolate can have its fat content reduced from 32 wt % to as low as 15% fat, and more typically within the range of 20 to 30 weight %, or 20 to 28 weight %, or 20 to 27 weight %. This is a reduction of 40% fat content, 12% less fat than the original. For chocolates generally, a fat reduction of 0–40% is achievable, a fat reduction of from 15 to 40% is preferred, and a fat reduction of from 25 to 40% is most preferred.

In addition to reducing the fat calories of the chocolate, the sugar calories of the chocolate can be reduced. Typically, chocolates contain various monosaccharides or disaccharides. These can be replaced by alternate sweeteners. These include sugar substitutes, such as aspartame, acesulfame K and the like; sugar alcohols, such as maltitol, lactitol, mannitol, and xylitol, and the like; and other polysaccharides such as polydextrose, polyfructose, and the like. These sugar substitutes, also called alternate sweeteners, typically are not metabolized by the body, or are less efficiently metabolized than are the mono and disaccharides normally used in chocolate.

The typical sugar content of chocolate is variable, but usually lies within the range of from 40 to 50%. However, in sugar reduced chocolates, the sugar content may be within the range of from 0.5 to 50 weight % sugar; preferably within the range of from 0.5 to 30 weight % sugar and most preferably within the range of 0.5 to 20 weight percent sugar. Some or all of this sugar can be replaced using these alternate sweeteners. The sugar calorie content of chocolate, can thus be reduced. Generally the reduction can be from 0 to 100%; preferably, from 50 to 95%, and most preferably from 80 to 100%.

Using the composite and the alternate sweeteners provide a chocolate confection having significantly fewer calories than traditional chocolate. Using this combination, one can prepare a chocolate confection having a total calorie content per 100 grams of from 180 to 415, preferably from 180 to 280, and most preferably from 180 to 220.

These chocolate confections can contain 20 to 30 weight percent fat, 3 to 30 weight percent of a cellulose/surfactant composite, preferably a microcrystalline cellulose/surfactant composite, and 0.5 to 50% sweetener, preferably an alternate sweetener.

Preferably the chocolate confection contains from 20 to 28% fat, 10 to 30% composite, and the sugar is a sugar substitute. More preferably, the chocolate confection contains 24 to 27% fat, 10 to 30% composite, and 0.5 to 40% alternate sweetener.

The composite can also be used to provide a reverse phase chocolate or a chocolate crumb.

The following examples are intended as a further illustration of the invention, but not as a limitation on the scope of the invention. All parts and percentages in the examples, and throughout this specification and claims, are by weight, and all temperatures are in degrees centigrade, unless otherwise indicated.

EXAMPLE 1

Preparation of a Coprocessed Cellulose Surfactant Ingredient

Avicel® FD 006 microcrystalline cellulose, a product of FMC Corporation, has an average particle size within the range of about 5 to 10 microns. Of this material, 1846.15 g. was dispersed in 11,287.15 g. of deionized water that had been heated to 82.2°–93.3° C. (180°–200° F.). The dispersion was processed using a Gifford-Woods Colloid Mill set at 70% speed (approximately 4900 rpm) and at 40 mil clearance. Then 200 g. of a surface active agent, a Polycon S60K sorbitan monostearate, a product of Witco Corporation having an HLB about 4.7 was first heated to 76.7° C. (170° F.), then added to the Avicel dispersion in the colloid mill. The mixture of dispersed Avicel and emulsifier was maintained at a temperature of 71.1° C. (160° F.) to keep the emulsifier above its melting point and in a liquid state. The mixture was then homogenized at 60.0°–65.6° C. (140°–150° F.) using a Manton-Gaulin homogenizer set at 2500 pounds per square inch (2000 psi, first stage, 500 psi second stage). The homogenized mixture at 60.0° C. (140° F.) was then pumped by a Moyno pump from a holding tank to the spray head of a two-fluid nozzle atomizer that was located in a Stork Bowen 3 foot diameter spray dryer. The material was atomized at 90 psi air pressure using a 0.1 inch nozzle, and then dried at 175° C. inlet temperature and 90° C. outlet temperature. The final material was dried to 2–4% moisture and was screened through a U.S. 60 mesh screen to produce a fine free flowing powder. This material can be used for a confectionery filling, such as for a caramel, a peanut butter filling or a spread.

EXAMPLE 2

Coprocessed Ingredient from a Cellulose Floc

Eight hundred fifty grams of Solka Floc® 200 FCC cellulose powder, a product of Fiber Sales and Development Corporation, a subsidiary of Protein Technologies, having a mean particle size 35 μ was slurried into 9000 grams of water heated to a temperature of 93.3° C. (200° F.). One hundred-fifty grams of sorbitan monostearate, a lipophilic surfactant having a HLB of about 4.7 and a melting point of 54.4° C. (130° F.), was melted and gradually added to the hot cellulosic slurry circulating through a Gifford Wood colloid mill (10 mil clearance) to produce mechanical emulsification of the surfactant in the continuous water phase. The resulting emulsion was passed through a two stage Manton Gaulin homogenizer first at 2500 psi then at 500 psi, and then spray dried to form a powder.

The spray drying was performed as follows: The homogenized slurry was atomized by feeding it at 90 psi atomizing air pressure to a 3 foot Bowen spray dryer having a nozzle with a 0.1 inch atomization opening. The slurry was fed to the dryer by means of a variable feed Moyno pump at a rate to provide the desired outlet temperature. The operating inlet and outlet air temperatures of the spray dryer were about 150° C. and 80° C., respectively. A free-flowing powder was obtained.

Essentially normal cellulose particles were observed when the free flowing spray dried powder was placed on a microslide and examined microscopically. Heat applied directly to the microslide with a hair dryer liquefied the particle surface layer and produced a puddling of material at the bottom of the cellulose particles when the melt point of the lipid layer was exceeded. The spray dried powder containing 85% cellulose and 15% sorbitan monostearate was reconstituted in water at 10% solids by vigorous hand-stirring. The coprocessed powder tended to float and to collect on the surface of the water. As a control, uncoated (not coprocessed) cellulose powder was added to water; it readily dispersed, swelled and remained suspended for several minutes.

EXAMPLE 3

Dry Coprocessing

Mechano Fusion is a technology for coprocessing two or more materials to obtain a modified material in which one of the materials is deposited onto the surface of another. The technology is based on using high intensity mixing and a compaction device. Ninety grams of Avicel® FD006 microcrystalline cellulose, a product of FMC Corporation, and 10 grams of Polycon® 60 sorbitan monostearate, a product of Witco Corp. having an HLB of about 4.7, were dry blended and placed in the Mechano Fusion® AM-15 coprocessor, a product of Hosokawa Micron International Inc. Shear was generated by the high intensity mixing and compaction and was monitored by an increase in the temperature of the powder. The powder was mixed, compacted, and scraped off of the walls of the chamber and the process was repeated. During the process, the temperature increased because of the intense shear. For this particular sample the process was stopped after the temperature reached 71.1° C. (160° F.) for 5 minutes, which allowed the surfactant to melt.

The resulting dry, coprocessed powder dispersed easily in oil, significantly faster than microcrystalline cellulose alone. When added to water the coprocessed powder floated on the surface; it would wet and settle to the bottom of the flask only after prolonged stirring; however, a non-coprocessed cellulose, such as the Avicel® FD006 microcrystalline cellulose, settled to the bottom immediately. This water washed composite, after prolonged high shear stirring in water and after the water was decanted, was air dried to a constant weight. This dried powder also would not wet easily when added to water indicating that the surface of the coprocessed microcrystalline cellulose was still modified compared to untreated microcrystalline cellulose.

EXAMPLE 4

Coprocessing in a Non-Aqueous Processing Fluid

An alternative method for coating MCC with a surfactant is by dissolving the surfactant in a solvent, adding the dissolved surfactant to MCC, mixing the MCC with the surfactant and evaporating the solvent. Thus, 10 g of Polycon 60® sorbitan monostearate, a product of Witco Corp having an HLB of about 4.7, was dissolved in 100 g of 2-propanol at 60° C. Then 90 g of fine grind MCC was added to the solution and stirred with a laboratory mixer for 5 min. The resulting paste was spread in a 6 inch cake baking dish and dried at 50° C. The resulting powder was evaluated in a manner described in Example 3. The powder performed very similarly to the powder in Example 3.

EXAMPLE 5

Use in Peanut Butter.

A sample of coprocessed microcrystalline cellulose composite prepared as in Example 1 was incorporated and tested in a formulation for reduced fat peanut butter as a bulking agent according to the following procedure: To 100 g of a commercial creamy peanut butter was added 10 g of the composite; and, as a control, 10 g of the parent, non coprocessed cellulose was added to a corresponding 100 g sample of the same commercial 'creamy' peanut butter. The samples were mixed in a Hobart mixer for 10 minutes at speed #1; then mixed for 30 minutes at speed #2. Between mixing sequences, any wall build-up was returned to the general mixture using a spatula.

The product with the composite had a creamy texture and was smoother than a comparable material made using the parent cellulose. The sample made with cellulose alone was dry and chalky, was slower to melt, and was more viscous after melting, compared to the parent peanut butter or to the peanut butter made with the composite.

EXAMPLES 6 (a–o)

Use in Chocolate

Coprocessed compositions and control compositions using cellulose were used in the following procedure for making chocolate. The amounts and proportions of the various non-cellulose ingredients are variable in the art. In the following example of a basic chocolate recipe, cellulose or a coprocessed cellulose/surfactant ingredient is assumed to be added at 10% of the weight of the entire composition. Addition of cellulose-based ingredients at other levels (5%, 13%) was also done; the approximate use levels can be found simply by altering the weight of cellulose added.

1. Mix chocolate liquor (9%), sugar (45%), milk powder (for milk chocolate) (14%), a portion of cocoa butter (about 15%, of a final total of about 22%), and coprocessed material or control cellulose (at 10% when present), in a Sigma/Z mixer for 10 to 20 minutes with a jacket temperature set at 54.4° (130 ° F.). (Dry ingredients are preblended prior to mixing.) Adjust the consistency of the final dough mass with either added cocoa butter or a longer mixing time.
2. Refine the dough mass immediately on a Day 5"×12", 3-roll refiner. Adjust the feeder rolls to deliver consistent mass to refining rolls; adjust the refining rolls to reduce the particle size to a uniform minimum of 20 microns. For milk chocolate, cooling water at 14.4° C. (58° F.) may be needed to maintain a finished refined mix temperature of under 60.0° C. (140° F.); dark chocolate can be processed at a higher temperature.

3. & 4. Conching 1 and 2: Conch in either of two continuous processors set in series for a continuous process; or conch for 8–12 hour in a Sigma mixer for a batch process. First, set to dry conch; second set to wet conch: add cocoa butter (the rest of the 7% saved from the first step) and lecithin (0.5%) if required to reduce process viscosity in the finish conch. Product temperature during the process should not exceed 87.8° C. (190° F.) for dark chocolate, or 65.6° C. (150° F.) for milk chocolate.

5. Temper the finished chocolate as follows: Pour out about 2/3 of the warm finished chocolate onto a marble table. Spread the chocolate into a thin layer about 1/4" deep onto the table. Work the chocolate by scraping and respreading until the mass is cooled to 30.0° C. (86° F.) for dark chocolate and 27.8° C. (82° F.) for milk chocolate. This will form stable seed crystals of cocoa butter. Reintroduce this cooled mass back into the container and mix vigorously with the rest of the chocolate. The final temperature should reach 33.3° C. (92° F.) for dark chocolate and 30.0° C. (86° F.) for milk chocolate in order for the entire mass to now crystallize into the most stable crystal form for cocoa butter.

6. Pour the tempered chocolate into moulds and tap to even the mass and remove excess air. Cool quickly with good ventilation at 18.3° C. (65° F.). Cooling will take about 40 minutes. Gently twist and remove the cooled chocolate from the moulds once the chocolate has fully contracted; the store the chocolate at 21.1° C. (70° F.) to develop optimum gloss and maintain proper temper.

containing the inventive composition. In addition, with the coprocessed material, in contrast to cellulose, a higher level of non-nutritive material can be incorporated without adverse taste effects, which leads to a greater reduction of fat and total calories for the finished food.

Also, the coprocessed material demonstrated a great stability in use. In the extended processing required to make chocolate, there was ample opportunity for the surfactant to become detached from the surface of the cellulose. It is evident from the results of the testing shown below that at least an effective layer of surfactant remained on the cellulose, so that it didnot become aggregated and did not revert to the taste of unmodified cellulose.

Sensory Evaluation of Milk Chocolates

Samples of milk chocolate made by the above method with coprocessed compositions and with cellulose were evaluated qualitatively for taste and texture. Coprocessing was by the method of Example 1, using the Avicel® FD006 microcrystalline cellulose of Example 1, or a related material Avicel® FD008 microcrystalline cellulose, having a significantly larger median particle size (8μ) than FD006 (about 6μ). Particle sizes were measured on a Horiba 7000 particle analyzer. The results are reported in Table 1.

In Table 1, "#" denotes an example number, "ratio" denotes the weight percent surfactant in the coprocessed composition, and "% in Choc" denotes the amount of cellulose or coprocessed material added as in step 1. Evaluation was by an expert informal sensory evaluation panel.

TABLE 1

Effect of additives in chocolate.

| # | Cellulose | Surfactant | Ratio | % in | Choc. Evaluation |
|---|---|---|---|---|---|
| 6a | (milk chocolate control, no additives reference) | | | none | (standard of |
| 6b | FD006 | (none) | | 10% | less taste, slow melt, slightly chalky |
| 6c | FD006 | (none) | | 5% | difference less, but still detectable |
| 6d | FD006 | sorbitan monostearate | 20% | 6% | no chalkiness, like standard |
| 6e | FD006 | sorbitan monostearate | 20% | 10% | no chalkiness; a little greasy |
| 6f. | FD006 | sorbitan monostearate | 10% | 10% | standard - no detectable difference |
| 6g | FD006 | sorbitan monostearate | 6% | 6% | slow melting, palate adhesion |
| 6h | FD006 | sorbitan monostearate | 6% | 4% | almost standard |
| 6i | FD006 | soy lecithin | 20% | 6% | oxidized lecithin taste; not chalky |
| 6j | FD006 | sodium stearoyl lactylate | 20% | 6% | detergent off-taste, not chalky |
| 6k | FD006 | glycerine | 10% | 6% | off flavor, waxy texture |
| 6l. | FD006 | polydextrose | 20% | 6% | poor texture, off flavor |
| 6m | FD006 | maltodextrin | 10% | 6% | very chalky, gritty |
| 6n | FD100 | (none) | | 4% | very chalky, dry |

The finished chocolate product produced with a coprocessed cellulose/surfactant material showed several improvements over a chocolate product with cellulose alone. In some variables, it was also an improvement over conventional chocolate. Among these improvements is a lower process viscosity and yield value, which can be dramatic at 10% and above of the coprocessed material, which is superior to control material containing cellulose alone. These improvements make it much easier to coat confectionery to a defined thickness and uniformity with chocolate These tests show that:

1. With a preferred surfactant for a particular food, in this case sorbitan monostearate for milk chocolate, very high levels (at least 10%) of a coprocessed cellulose/surfactant ingredient can be incorporated with no effect on texture or taste.

2. With other surfactants differing in HLB, poor taste can result, even if chalkiness is masked. The most successful surfactant employed in this Example 6, sorbitan monostearate, had a HLB of about 4.7. Emulsilac SK, sodium stearoyl lactate, a Witco product that has an HLB of 20 was used, and it appeared to work better as moisture levels increase. Lecithin with an HLB of about 5 and mono, di-glycerides with an HLB of about 2.8 gave taste notes intrinsic to their compositions. Surfactant intrinsic taste is also a variable commonly considered in food manufacture.

3. Coprocessing with materials not of the invention, as in samples 6k, 6l and 6m, failed to mask the chalky taste of the cellulose and/or imparted a bad texture, even at low use levels.

EXAMPLE 7

Preparation of Samples for Quantitative Evaluation of Sensory Effects

A standard simple test system was used and prepared by the following recipe. In a 600 ml. beaker, 250 grams. of a hard fat, cocoa butter, was melted by heating on a heating mantle. With constant mixing, using a Caframo mixer set at 500–1000 rpm speed, a quantity of 12.5 grams., 25.0 grams., or 50 grams., of the coprocessed ingredient was added and dispersed in the melted fat by stirring. The fat was at a temperature of 48.8° C.–60.0° C. (120° F.–140° F.), which is above the melting point of cocoa butter.

The melted fat containing the dispersed material was poured into forms of about 1" square (small polyethylene weighting boats). The samples were then set in a freezer for 30 minutes to 1 hour to 'set' the dispersed material in the fat. These samples with varying levels of ingredients were tasted by a specific sensory protocol to characterize and quantify differences.

EXAMPLE 8

Quantitative Sensory Results

A formal sensory protocol was used to quantitify taste and texture differences, using standard sensory panel testing methods. This sensory protocol identified three groups of attributes affecting the mouthfeel, which were important in understanding the effect of incorporating cellulosic materials in a non-aqueous/low moisture system. These attribute groups were astringency-related, described as drying, roughing, puckering; particle-related, described by overall amount of particles, size, chalkiness; and melt- related, described by melt rate, melt consistency (homogeneity), and by residual mouth-coating.

The results of the testing showed improved mouth feel characteristics in all three attribute groups. Cellulose alone had a considerable gritty or chalky feel depending on the particle size. The coprocessed cellulose/surfactant material significantly reduced those effects. There was also an improvement (decrease) of the "drying, roughing, puckering" effect especially at the higher use levels of the coprocessed material in the cocoa butter medium. Finally, there was an improvement in melt consistency by using a coprocessed material. All these improvements together gave a much more palatable texture.

The averaged results obtained by nine taste testers on the variable "chalky" were obtained, using materials prepared as in Example 7. The coprocessed ingredients were prepared as in Example 1, using Avicel® FD006 microcrystalline cellulose ("cellulose"), a product of FMC Corporation coprocessed with 10% of sorbitan monostearate (sample "S"). Results are shown in Table 2. The numbers obtained are the perceived "chalkiness"; higher numbers indicate a more chalky mouthfeel. Note that the perceived values of the control (no additive) material vary between tests over a range of 0.7 units.

TABLE 2

| | Relative Chalkiness | |
|---|---|---|
| Additive type: | Cellulose only | Coprocessed "S" |
| additive use level: | | |
| no-additive control | 2.4 | 1.7 |
| 5% 2.9 | 2.1 | |
| 10% 4.8 | 2.7 | |
| 20% 7.2 | 2.7 | |

At 5% addition, the unprocessed cellulose was not significantly chalkier than the base cocoa butter; however, at 10% and 20% addition, the cellulose-only samples were very significantly chalky. The coprocessed material was similar to the no-cellulose control at a low level of addition; at higher levels, however, the coprocessed material increased in chalkiness only slowly with use level, whereas the cellulose only control increased rapidly in chalkiness with increasing use level; and even at a use level of 20% the coprocessed sample was not significantly higher than the control level, while the cellulose only sample was significantly chalkier.

EXAMPLE 9

Dispersion of Surfactant

A coprocessed material was prepared as in Example 1 with the exception that a small amount of the oil-soluble dye Oil Red O was used with the surfactant. As a control, the surfactant, sorbitan monostearate, was melted, mixed with an equivalent amount of dye, cooled, and cut up into pieces. When added to a room temperature liquid soybean oil, the coprocessed cellulose-surfactant ingredient easily dispersed, producing a smooth viscous suspension, and the dye was extracted from the particles into the oil. When pieces of dyed sorbitan monostearate were dispersed into room temperature oil, the pieces immediately settled to the bottom of the container without dissolution of the surfactant, and the dye was not significantly extracted from the particles. When the so Bution was heated, the particles dissolved and the dye was extracted. This demonstrates that the coprocessed material of the invention can also act as a method of dispersing suffactants into a food or other system.

EXAMPLE 10

Fat Phase Truffle

The following is one method for preparing a fat phase truffle. Dark chocolate is heated in a microwave set at full power for 5 minutes to heat it to a temperature of 54° C., then placed in a bowl and cooled to 32° C. Nut paste, melted vegetable fat, and flavoring are then added, and the mixture is mixed using a Hobart paddle mixer, first at about speed 1. The mixer speed is then increased to speed 2, with either the composite or the microcrystalline cellulose being added with mixing.

The admixture is poured into and spread in a shallow pan; then it is cooled to 30° C. or lower, until it is sufficiently firm to scoop with a cookie dropper or a melon scooper; after which it is rolled and dusted with a cocoa powder, using dutched cocoa powder, which contains 10–12% fat.

The truffle containing the composite tastes the same as the truffle that contains no cellulose ingredient, and has a better taste and texture than cellulose alone; in this example the use of either the neat cellulose or the composite results in a product having an approximately 10% reduction in fat in the formula, as compared to the control.

TABLE 3

Fat Phase Truffle

| Ingredients | Control %/grams | Neat Cellulose %/grams | Composite %/grams |
|---|---|---|---|
| Dark Chocolate | 62.18% | 56.99% | 56.99% |
| | 1200 grams | 1100 grams | 1100 grams |
| Hazelnut Paste | 31.09% | 31.09% | 31.09% |
| | 600 grams | 600 grams | 600 grams |
| Hydrogenated Coconut Oil | 6.22% | 1.45% | 1.45% |
| | 120 grams | 28 grams | 28 grams |
| Rum Flavor | 0.52% | 0.52% | 0.52% |
| | 10 grams | 10 grams | 10 grams |
| Composite | 0% | 0% | 9.95% |
| | 0.00 grams | 0.00 grams | 192 grams |
| Neat Cellulose | 0% | 9.95% | 0% |
| | 0.00 grams | 192 grams | 0.00 grams |
| Total | 100.00% | 100.00% | 100.00% |
| | 1930 grams | 1930 grams | 1930 grams |

Preferred ingredients:
Dark chocolate couverture
Pure hazelnut paste
Partially hydrogenated palm kernel/coconut, Pureco 90/92, a product of Karlshamns Co.
Natural and artificial Jamaican rum extract FA 34, a product of Virginia Dare.
Avicel®microcrystalline cellulose, Avicel is a trademark of the FMC Corporation.
Composite: 90% Avicel®microcrystalline cellulose/10% sorbitan monostearate.

EXAMPLE 11

Caramel

Caramel is a syrup phase confection having a sugar syrup base of water soluble components. Into this base other materials are dispersed to form taste and texture. These components include sweetened condensed milk and butter oil. The milk solids, specifically the proteins in the milk solids, react with the reducing sugars to produce the Maillard reaction known as 'carmelization.' That reaction provides the characteristic color and flavor of caramel. The butter oil provides luibricity to the confections.

In a caramel, the composite functions as a texturizer, which permits the production of a higher moisture formula, thus giving the manufacturer an opportunity to reduce the cost of the caramel. The higher moisture also permits a process time reduction because not as much water has to be boiled off to get the proper structure for the soft caramel. Typically each caramel has the same ingredients but different degrees of softness, sometimes called chewiness, which is controlled by the modification of the moisture content. Typically, softness varies with moisture content over a range of from 6 to 12% moisture based on the weight of the caramel, with very noticeable changes in the texture and flow characteristics of the caramel as it increases in overall moisture content at 2% increments.

The use of the composite provides a higher moisture caramel with the same texture and flow characteristics as a lower moisture caramel; thus, a caramel can be made that will have similar texture and flow properties as a caramel that has an approximately 2% lower overall moisture content. For example, this product permits the production of a caramel with 14% moisture, that will have the same texture and flow as a traditional caramel having 12% moisture. The composite permits control of graining and cold flow.

The texture of the caramel made with the composite has approximately 2% more moisture and 33% less fat than does the control, and is as good as the control. The composite also provides better tooth release and eating quality.

The caramel is prepared by first dissolving salt and then dissolving sugar in water. The solution is brought to a boil at 110° C. While maintaining this temperature, the following ingredients are added with stirring: corn syrup, followed by lecithin, sweet condensed skim milk, butter oil, and then a slurry of composite dispersed in 200 grams of water. The resultant mixture is cooked to 110° C., and is then carmelized at 118° C. with a controlled cook time of about 21 minutes. Then 200 grams of water is added and the mixture is quickly brought to a reboil at 118° C. for 12 minutes, except that for the caramel containing 10% composite reboil occurs at 114° C. Vanilla is then added with stirring, followed by cooling the mixture to 90° C. This mixture is then transferred onto a slightly greased sheet tray, cooled to room temperature, and cut to any desired shape.

The caramel containing the composite is comparable in taste and texture to the caramel without the composite, and has a better texture than caramel with cellulose alone.

TABLE 4

Caramel

| Ingredients | Control %/grams | Composite %/grams | Composite %/grams |
|---|---|---|---|
| Sugar | 20.21% | 18.94% | 18.94% |
| | (680 g) | (680 g) | (680 g) |
| Water | 13.44% | 18.89% | 18.89% |
| | (452 g) | (678 g) | (678 g) |
| 63 DE Corn Syrup | 33.65% | 31.53% | 31.53% |
| | (1132 g) | (1132 g) | (1132 g) |
| Sweetened Condensed Skim Milk | 20.21% | 18.94% | 18.94% |
| | (680 g) | (680 g) | (680 g) |
| Butter Oil | 11.77% | 6.69% | 6.69% |
| | (396 g) | (240 g) | (240 g) |
| Vanilla | 0.30% | 0.28% | 0.28% |
| | (10 g) | (10 g) | (10 g) |
| Lecithin DA 51 | 0.21% | 0.19% | 0.19% |
| | (7 g) | (7 g) | (7 g) |
| Salt | 0.21% | 0.19% | 0.17% |
| | (7 g) | (7 g) | (7 g) |
| Composite | 0% | 0% | 4.35% |
| | (0 g) | (0 g) | (156.0 g) |
| Neat Cellulose | 0% | 4.35% | 0% |
| | 0.00 g | 156.0 g | 0.00 g |
| Total | 100% | 100% | 100% |
| | (3364 g) | (3590 g) | (3590 g) |

Preferred ingredients:
Dixie Crystals extra fine granular sugar, Savannah Sugar Refinery, Savannah Foods and Industries, Inc.
Staley Sweetose 4300, 63DE corn syrup, A. E. Staley Manufacturing, Co.
Sweetened condensed skim milk, Galloway Co.
Anhydrous milk fat, Mid-America Farms.
Two-fold vanilla extract, Virginia Dare.

Metarin DA51 lecithin, a product of Lucas Meyer, Inc.

Premier fine flake salt, Cargill Salt Division.

Avicel® FD 006 microcrystalline cellulose. Avicel is a trademark of the FMC Corporation.

Atmos® 150K glycerol monostearate having an HLB of 3.5. Atmos is a trademark of Witco Corporation.

Composite is a particle with a median size of approximately 10 micron that is an 90/10 w/w Avicel® FD008 microcrystalline cellulose/Atmos®150K glycerol monostearate.

EXAMPLE 12

Fudge

Fudge, like caramel, is a syrup phase confection; however, unlike caramel, fudge includes sugar crystals to shorten its texture; as a consequence, fudge is sometime referred to as a grained confection.

The fudge is prepared by first dissolving salt and then dissolving sugar in water. The solution is brought to a boil at 110° C. While maintaining this temperature, the following ingredients are added: corn syrup, lecithin, sweet condensed skim milk, and butter oil; then followed by a slurry of the composite, which slurry had been prepared by dispersing the composite in 200 grams of water. The resultant mixture is first cooked to 110° C., and then carmelized at 115° C. Then 200 grams of water is added and the mixture is quickly brought to a reboil at 118° C. for 12 minutes, except that for the 10% composite containing fudge, reboil occurs in 7 minutes at 114° C. Vanilla is then added with stirring, followed by cooling the mixture to 90° C. Add icing sugar predispersed in sorbitol to set the sugar crystals to grain. This mixture is then poured onto a slightly greased sheet tray, cooled to room temperature, and cut to any desired shape.

The recipe used for the control and two different products, one containing a composite, the other containing a neat cellulose, are described in Table 5. The fudge containing the composite has approximately 2% higher moisture and significantly (67%) less fat than the control; yet, the fudge containing the composite is comparable in taste and texture to the control and has a better texture than does the sample with cellulose alone.

TABLE 5

| | Fudge | | |
|---|---|---|---|
| Ingredients | Control | Neat Cellulose %/grams | Composite %/grams |
| Sugar | 25.04% (1132 g) | 18.54% (1132 g) | 18.54% (1132 g) |
| Water | 17.52% (792 g) | 38.92% (2376 g) | 38.92% (2376 g) |
| 63 DE Corn Syrup | 25.04% (1132 g) | 18.54% (1132 g) | 18.54% (1132 g) |
| Sweetened Concensed Skim Milk | 15.04% (680 g) | 11.14% (680 g) | 11.14% (680 g) |
| Butter Oil | 11.77% (532 g) | 1.96% (119.6 g) | 1.96% (119.6 g) |
| Icing Sugar/Fondant | 2.50% (113.2) | 1.85% (113.2 g) | 1.85% (113.2 g) |
| Sorbitol | 2.50% (113.2 g) | 1.85% (113.2 g) | 1.85% (113.2 g) |

TABLE 5-continued

| | Fudge | | |
|---|---|---|---|
| Ingredients | Control | Neat Cellulose %/grams | Composite %/grams |
| Vanilla | 0.22% (10 g) | 0.16% (10 g) | 0.16% (10 g) |
| Lecithin DA51 | 0.19% (8.5 g) | 0.14% (8.5 g) | 0.14% (8.5 g) |
| Salt | 0.19% (8.5 g) | 0.14% (8.5 g) | 0.14% (8.5 g) |
| Compsosite | 0% (0 g) | 0.00% (0 g) | 6.75% (412.4 g) |
| Neat Cellulose | 0% (0.00 g) | 6.75% (412.4 g) | 0% (0.00 g) |
| Total | 100% (4521.4 g) | 100% (6105.4 g) | 100% (6105.4 g) |

Preferred ingredients:

Dixie Crystals extra fine granular sugar, Savannah Sugar Refiner, Savannah Foods and Industries, Inc.

Staley Sweetose 4300, 63DE corn syrup, A. E. Staley Manufacturing Co.

Sweetened condensed skim milk

12× fondant and icing sugar

Neosorb liquid sorbitol, 70/02, Roquette Corp.

Anhydrous milk fat

Two-fold vanilla extract, Virginia Dare

Metarin DA51 lecithin, a product of Lucas Meyer, Inc.

Premier fine flake salt

Avicel® FDO08 microcrystalline cellulose, Avicel is a trademark of the FMC Corporation Atmos®150K glycerol monostearate having an HLB of 3.5. Atmos is a trademark of Witco Corporation.

Composite is a particle with a median size of approximately 10 micron that is an 90/10 w/w Avicel® FD008 microcrystalline cellulose/Atmos®150K glycerol monostearate.

EXAMPLE 13

Nougat

Use the following procedure and the recipe provided in Table 6 to make a nougat. First predisperse the microcrystalline cellulose control or the composite in enough water to make a slurry or a paste. Dissolve sugar in water; add corn syrup and malt and cook to 126° C. Add the predispersed microcrystalline cellulose control or the composite at this time. Dissolve egg albumen in water and invert sugar and whip in a Hobart mixer with a wire whip, starting with the slowest speed but progressing to the highest speed for the final whip. Then add cooked syrup and whip to a density of 0.4–0.5, again mixing at the highest speed. Then add cocoa powder and icing sugar; follow this with fat addition with slow mixing. The fat must be melted to a liquid before this addition; then transfer the final mixture onto a slightly greased waxed or poly coated paper; cover overnight; then cool, cut to shape, and enrobe in chocolate. The two samples are similar in taste and in texture to the control.

TABLE 6

| | Nougat | | |
|---|---|---|---|
| Ingredients | Control %/grams | Neat Cellulose %/grams | Composite %/grams |
| Sugar | 27.43% | 25.29% | 25.29% |
| | 1300 grams | 1300 grams | 1300 grams |
| Water | 8.44% | 15.56% | 15.56% |
| | 400 grams | 800 grams | 800 grams |
| 63 DE Corn | 33.76% | 31.13% | 31.13% |
| Syrup | 1600 grams | 1600 grams | 1600 grams |
| Malt Extract | 0.84% | 0.78% | 0.78% |
| | 40 grams | 40 grams | 40 grams |
| Egg Albumen | 0.84% | 0.78% | 0.78% |
| | 40 grams | 40 grams | 40 grams |
| Water | 6.33% | 5.84% | 5.84% |
| | 300 grams | 300 grams | 300 grams |
| Invert Sugar | 10.55% | 9.73% | 9.73% |
| | 500 grams | 500 grams | 500 grams |
| Cocoa Powder | 2.11% | 1.95% | 1.95% |
| | 100 grams | 100 grams | 100 grams |
| Icing Sugar/ | 2.11% | 0.97% | 0.97% |
| Fondant | 100 grams | 50 grams | 50 grams |
| | 7.59% | 4.4% | 4.4% |
| | 360 grams | 226 grams | 226 grams |
| Cellulose or | 0% | 0% | 3.58% |
| Composite | 0.00 grams | 0.00 grams | 184.0 grams |
| Neat Cellulose | 0% | 3.58% | 0% |
| | 0.00 grams | 184.0 grams | 0.00 grams |
| Total | 100.00% | 100.00% | 100.00% |
| | 4740 grams | 5140 grams | 5140 grams |

Preferred ingredients:

Extra fine granular sugar

Staley Sweetose 4300, 63DE corn syrup, a product of A. E. Staley Manufacturing Company Malt Extract #102 medium, a product of Malt Products Corporation Egg white solids, spray dried, P-110, a product of Henningsen Foods, Inc.

Nulomoline invert syrup, Ingredient Technology Corporation

Dutched 10–12% fat cocoa powder, PD 205, a product of Cocoa Barry

12× fondant and icing sugar, a product of American crystal Sugar Company

Partially hydrogenated palm kernel/coconut oil, Pureco 90/92, a product of Karlshamns Co.

Avicel® FD008 microcrystalline cellulose. Avicel is a trademark of the FMC Corporation.

Triodan55 polyglycerol ester, a product of Grinsted Products, having an HLB of 6.8.

Composite is a particle with a median size of approximately 8 to 12 micron that is an 90/10 w/w Avicel® FD008 microcrystalline cellulose/Triodan 55 polyglycerol ester.

EXAMPLE 14

Chocolate Chip

A typical chocolate chip is about 30% fat. The chocolate chip is a dark chocolate that has been prepared as in Example 6, with the exception that it is deposited as a drop.

The sensory result good for each of the respective chocolates.

EXAMPLE 15

Pudding

A pudding is prepared, as follows.

First a composite is prepared, as follows: A coprocessed fine particle size microcrystalline cellulose (mcc) having a 6 to 8 micron median particle size, is coprocessed at a 80 to 20 weight ratio with a Emulsilac®SK sodium stearoyl lactylate (ssl) (a product of Witco, having an HLB 20) and dried to a fine powder according the procedure of Example 1.

The pudding is prepared using the ingredients as specified in Table 7, by first mixing the dry ingredients; then adding the ingredient mixture to cold milk; followed by blending the milk with those ingredients.

The mixture is stirred and cooked in a double boiler until thickened at about 82.2° C. (180° F.), at which time the heat is reduced to a medium setting and cooked with continual stirring for about 15 minutes.

The resulting mixture is cooled slightly within the range of about 48.9° C. tO 60.0° C. (120° F. to 140° F.); vanilla is then added; and the resulting mixture is poured into molds which are placed in a refrigerator and cooled for 1 or 2 hours.

The Blanc Mange made with the composite is as tasty as that made without composite.

TABLE 7

| | Pudding | |
|---|---|---|
| Ingredients | Control Weight % | Composite Weight % |
| 1% Fat Milk | 84.86 | 84.86 |
| Sugar | 10.37 | 9.37 |
| Corn Starch | 4.53 | 4.53 |
| 80% mcc/20% ssl | 0.00 | 1.00 |
| Table Salt | 0.13 | 0.13 |
| Two-fold Vanilla Extract | 0.11 | 0.11 |
| Total | 100.00% | 100.00% |

Preferred Ingredients:

Emulsilac® sodium stearoyl lactylate, a product of Witco Corporation, having an HLB of 20.

A microcrystalline cellulose having a median particle size of 6 to 8 microns.

Composite is a particle with a median size of 10 to 15 microns that is an 80/20 w/w microcrystalline cellulose/Emulsilac® sodium stearoyl lactylate.

EXAMPLE 16

Use in a Bread

A bread dough is made by mixing 63 pounds of a wheat flour, 1.5 pounds of table salt, 1.5 pounds of yeast, 36 pounds of water, and 1 pound of a lard. The mixture is allowed to sit for 4 hours, and then baked in an oven at 176.7° C. (350° F.) for one hour.

A second bread dough is made by mixing 57.2 pounds of wheat flour, 1.5 pounds of table salt, 6.3 pounds of composite prepared as in Example 2 (with the exception that Myverol SMG succinylated monoglycerides, a product of Eastman Chemical Products, Inc. having an HLB of 4 to 6, was used as the surfactant), 1.5 pounds of yeast, 36 pounds of water, 0.5 pounds of lard. This mixture is allowed to sit for 4 hours, and is then baked in an oven at 350° F. for one hour.

One hour after the breads have been removed from the oven, they are compared. The taste and texture are comparable.

EXAMPLE 17

Low Fat Meat

A low fat meat can be prepared using the following procedure, and the ingredients specified in Table 8. First, Trim pork and beef then blend to make a 50:50 mixture at desired fat levels. Chop a lean meat portion, add salt, sodium nitrite and half the volume of water as 50% water/50% ice; then add the remaining dry ingredients; then add what remains of the water and the fat meat blend. Run this mixture through an emulsifier with a 0.4 mm plate; stuff the mixture into casings; cook it in a smokehouse using gradient heating with fast air circulation; then shower it; chill it; peel it; and vacuum package the final product.

For evaluation, the products are simmered in water and served warm without condiments. A sensory preference panel can then evaluate the products, for preference evaluation using a 9-point hedonic scale on which a score of "9" represents an excellent product and a score of "1" represents an extremely poor product.

Using this evaluation process, both the control and the composite containing sample obtain a score of 6 to 7.

TABLE 8

Low Fat Meat

| Ingredients | Control % | Composite % |
| --- | --- | --- |
| Lean Meat Blend 3.6% Fat | 20.33 | 33.92 |
| Composite | 0.00 | 1.50 |
| Fat Meat Blend 48.1% Fat | 52.47 | 24.38 |
| Water | 21.73 | 34.43 |
| Salt | 2.20 | 2.20 |
| Seasoning | 3.22 | 3.22 |
| Sodium Erythorbate | 0.04 | 0.04 |
| Sodium Nitrite | 0.01 | 0.01 |
| Carageenan | 0.00 | 0.30 |
| Total | 100.00% | 100.00% |

Ingredients:

Gelcarin® XP8004 carageenan. Gelcarin is a trademark of FMC Corporation.

Composite is a particle with a median size of approximately 15 to 20 micron that is an 80/20 w/w Avicel®FD008 microcrystalline cellulose/Atmul®84K mono and diglycerides. Avicel is a trademark of FMC Corporation. Atmul®84K is a surfactant manufactured by of Witco Corporation having an HLB of 2.8.

EXAMPLE 18

REDUCED FAT CHOCOLATE MOUSSE

A reduced fat chocolate mousse can be made using the ingredients specified in Table 9, as follows. In a first container, dry blend sugar, non-fat milk, milk chocolate crumb, cocoa, milk protein, modified starch, gelatin, emulsifier and carrageenan. In a separate container disperse a cellulose/surfactant composite in water with a high speed mixer, preferably of the Silverson type, with about 10 minutes of mixing; then add the dry blend from the first container with continuous stirring. While stirring, bring the heat up to 80° C. using a steam-jacketed kettle. Homogenize the mixture at 180 kg/cm$^2$ to insure proper mixing; then cool to 15° C. Once cooled to 15°, aerate and then deposit into containers.

The chocolate mousse made using the composite is at least as good as the chocolate mousse made using neat cellulose.

TABLE 9

Reduced Fat Chocolate Mousse

| Ingredients | Cellulose-no composite Percent by Weight | Composite Percent by Weight |
| --- | --- | --- |
| Water | 64.89 | 64.45 |
| Sugar | 15.00 | 15.00 |
| Non-Fat Dry Milk | 6.10 | 6.10 |
| Milk Chocolate Crumb | 5.00 | 5.00 |
| Cocoa | 2.55 | 2.55 |
| Milk Protein | 2.00 | 2.00 |
| Modified Starch | 2.00 | 2.00 |
| Gelatin (200 Bloom) | 1.75 | 1.75 |
| Avicel ® CL 611 Cellulose | 0.50 | 0.50 |
| Composite | 0.00 | 0.55 |
| Emulsifer | 0.11 | 0.00 |
| Carrageenan | 0.10 | 0.10 |
| Total | 100.00% | 100% |

Preferred ingredients:

Lactodan p22 k lactic acid ester of monoglycerides, a product of Grinsted Products, Inc. used as the emulsifier in the no composite example and used to make the composite used in the other example.

Avicel®CL611 microcrystalline cellulose. Avicel is a trademark of FMC Corporation.

A microcrystalline cellulose having a particle size of 10 microns.

Composite is a particle with a median size of approximately 15–20 micron that is a 80/20 w/w microcrystalline cellulose/Lactodan p22 k

EXAMPLE 19

Whipped Topping

A reduced fat, baker's whipped topping can be prepared as follows using the ingredients provided in Table 10.
1. Using a high speed mixer, disperse Novagel®RCN 15 microcrystalline cellulose, in water. Novagel is a trademark of FMC Corporation.
2. Gradually add a cellulose gum and continue mixing for 5 minutes.
3. Blend nonfat dry milk and sugar. Add the blend to the above mixture and continue mixing for 5 minutes.
4. Add corn syrup and start heating to 62.8° C. (145° F.).
5. In a separate container, heat the fat and emulsifiers to 60.0° C. (140° F.).
6. Add the oil and emulsifiers 60.0° C. (140° F.) to the aqueous phase (batch) when the aqueous phase reaches 62.8° C. (145° F.) with continued mixing.
7. Pasteurize the mix at 71.1° C. (160° F.) for 30 minutes.
8. Homogenize the mix at 2500 pounds per square inch.

9. Cool the mix to 4.4° C. (40° F.) and age for 24 hours.
10. Whipping instructions: Measure 700 grams of the just prepared mix into a chilled 5 quart Hobart® mixer bowl. Using a wire whip attachment at high speed(#3), whip for 2 1/2 to 3 minutes.

The whipped topping containing the composite is as tasty and as light and as airy as the whipped topping containing cellulose, but no composite.

TABLE 10

Whipped Topping

| Ingredients | Cellulose(no composite) Percent by Weight | Composite Percent by Weight |
|---|---|---|
| Water | 62.90 | 61.10 |
| Non-fat dry milk | 12.50 | 12.50 |
| Sugar | 9.00 | 9.00 |
| Partially hydrogenated vegetable oil | 7.00 | 7.00 |
| Corn Syrup, 42 D.E. | 6.00 | 6.00 |
| Novagel ® RCN 15 coprocessed microcrystalline cellulose/guar | 2.00 | 2.00 |
| Composite | 0.00 | 2.25 |
| Polysorbate 60 | 0.30 | 0.00 |
| Cellulose gum | 0.15 | 0.15 |
| Distilled monoglycerides | 0.15 | 0.00 |
| Total | 100.00% | 100.00% |

Preferred Ingredients:

A Paramount B partially hydrogenated vegetable oil, a product of Van Den Bergh Foods CMC-7HF cellulose gum, a product of Hercules Inc.

Composite is a particle with a median size of approximately 15 to 20 micron that is an 80/14/6 w/w Avicel FD008 microcrystalline cellulose, a product of FMC corporation, and a surfactant that is a mixture of Tween 60, polysorbate 60, a product of ICI Americas, Inc., having an HLB of 14.9 and Myverol 18-06, distilled monoglycerides, a product of Eastman Chemical, having an HLB of 3.8.

EXAMPLE 20

Salad Dressing

A reduced calorie heat stable salad dressing can be made as follows, using the ingredients as specified in Table 11.
Part I
Prepare a cellulose composite as in Example 1 using 80 wt % of a microcrystalline cellulose having a median particle size of 8 to 12 microns and 20 wt % of Tween®60 a polyoxyethylene sorbitan monostearate, a product of ICI Americas, Inc., which has an HLB of 14.9.
Part II
Predisperse the cellulose, either the Avicel CL-611 microcrystalline cellulose or the composite, in 90% of the available water using a planetary mixer. Then add xanthan gum and hydrate for 10 minutes. To this mixture add a previously combined Polysorbate 60 and oil in a slow continuous stream with mixing for 15 minutes. Add starch slurried in the remaining water. Add and blend the remaining dry ingredient, except salt, and mix for 2 minutes. Ad sorbitol solution and mix 2 minutes. Combine vinegar and salt and add to the above emulsion, with mixing for 5 minutes. Homogenize this mixture at 2000 psi (1st stage) and 500 psi(2nd stage) at a total pounds per square inch of 2500. Heat in a kettle to 71.1° C. (160° .F) with the main vegetable or meat component. A 60:40 weight ratio of main component to dressing is recommended. Hot fill and retort the total product using good manufacturing process techniques.

The Avicel®CL-611 microcrystalline cellulose and the composite samples each performed well, each with about the same results, when compared to other dressings.

TABLE 11

Salad Dressing

| Ingredients | MCC Weight Percent | Composite Weight Percent |
|---|---|---|
| Water | 54.08 | 54.08 |
| Vinegar (50 grain) | 15.00 | 15.00 |
| Vegetable oil | 12.00 | 12.00 |
| Sorbitol (70% solution) | 10.00 | 10.00 |
| Avicel ® CL-611 MCC | 4.50 | 3.54 |
| Composite | 0.00 | 1.20 |
| Starch-purity 420 | 2.00 | 2.00 |
| Salt | 1.50 | 1.50 |
| Mustard Powder | 0.30 | 0.30 |
| Xanthan Gum | 0.25 | 0.25 |
| Polysorbate 60 | 0.24 | 0.00 |
| Onion Powder | 0.10 | 0.10 |
| White Pepper | 0.02 | 0.02 |
| Ascorbic Acid | 0.01 | 0.01 |
| Total | 100.00% | 100.00% |

EXAMPLE 21

Non-Dairy Creamer

A reduced fat, non-dairy creamer is prepared using the ingredients specified in Table 12, as follows: Dry blend the ingredients; then mix them with water at 140° F.; then mix in premelted vegetable fat; and then mix in corn syrup. Pasteurize the mixture at 160° F. for 30 minutes; then homogenize the mixture in a two stage homogenizer having a 2500 pound per square inch first stage and a 500 pound per square inch second stage. Cool and freeze the homogenized product at 0° to −10° F.

The non-dairy whiteners are added to coffee, then stirred, and finally tasted. Each appears the same and has the same characteristics for blending and for taste, as does the other.

TABLE 12

Non-Dairy Creamer

| Ingredients | Control Weight Percent | Composite Weight Percent |
|---|---|---|
| Water | 74.50% | 74.50% |
| 36 DE Corn Syrup Solids | 12.75% | 12.15% |
| Hydrogenated Soybean Oil | 10.0% | 10.0% |
| Sodium Caseinate | 2.5% | 2.5% |
| Sodium Stearoyl Lactylate | 0.10% | 0.00% |
| Polysorbate 60 | 0.05% | 0.00% |
| Dipotassium Phosphate | 0.10% | 0.10% |
| Composite | 0.00% | 0.75% |
| Total | 100.00% | 100.00% |

Preferred Ingredients:

Composite is a particle with a median size of approximately 15 to 20 microns that is an 80/14/6 w/w Avicel FD008 microcrystalline cellulose, a product of FMC corporation/Emulsilac®SK sodium stearolyl lactylate, a product of Witco Corporation having an HLB of 20, and Polycon®T60K polyoxyethylene sorbitan monostearate, a product of Witco Corporation having an HLB of 14.9.

EXAMPLE 22

Fabricated Frozen French Fry

A fabricated frozen french fry was prepared using the ingredients specified in table 13, as follows:

Part I

First a composite is prepared according to the procedure of Example 1 using an initial microcrystalline cellulose having an approximately 10 micron median particle size and Myverol®18-06 a monoglycerides from hydrogenated vegetable oil produced by Eastman Kodak having an HLB of about 3.8 to provide an 80/20 w/w composite having an median particle size of approximately 25 to 30 median particle size.

Part II

With a high-speed propeller mixer disperse the cellulose, either the Avicel® cellulose gel or the composite, in the water portion of the batch, mixing for approximately 10 minutes.

Part III

Completely blend the remaining dry ingredients using a Hobart® type mixer with a wire whip on speed #1 for 3 minutes.

Place the dry blended ingredients in the Hobart mixer with a paddle type attachment. Set the mixer on #1 speed, slowly adding the predispersed cellulose prepared in Part I; and then mixing for a maximum of 3 minutes.

Allow the mixture to stand for 10 minutes to hydrate and develop the dough.

Part IV

Extrude, then cut and pan fry at 173° C. (3459) for 30 seconds, then quick freeze and store.

To evaluate the product, fry the french fry at 190.6° C. (375° F.) for 90 seconds; and evaluate under a 60° C. (140° F.) heat lamp.

Results

The fabricated frozen french fries made with the composite as well as with those made with the Avicel® microcrystalline cellulose are comparable in quality to those made without either of these two ingredients.

The composite provides structural firmness and integrity to the dough, thus improving the extrudability of the dough reducing breakage during and after extruding. This structural effect also improves the body and texture of the finished fry providing a smoother consistency, fewer void spaces, and a thinner crust. The result is a more tender but firm fry with a more pleasing mouthfeel.

As the composite level is increased, there is a corresponding increase in the firmness.

TABLE 13

| | Fabricated French Fry | |
|---|---|---|
| Ingredients | Control Weight Percent | Composite Weight Percent |
| Potato Granules | 26.49 | 26.49 |
| High Amylose Corn Starch | 7.02 | 5.62 |
| Salt | 0.70 | 0.70 |
| Guar Gum | 0.53 | 0.53 |

TABLE 13-continued

| | Fabricated French Fry | |
|---|---|---|
| Ingredients | Control Weight Percent | Composite Weight Percent |
| Emulsifier | 0.35 | 0.00 |
| Avicel® RC-591F Cellulose Gel | 1.0 | 0.40 |
| Composite | 0.00 | 1.75 |
| Water | 63.91 | 64.51 |
| Total | 100.00% | 100.00% |

EXAMPLE 23

Vegetable Oil Spread

Use the following procedure to prepare a vegetable oil spread.

Aqueous portion

Disperse Avicel®RC591F cellulose gel in available water

Add xanthan gum and allow 5 minutes for complete incorporation.

Incorporate the remaining aqueous portion and mix thoroughly for 10 minutes.

Heat the resulting aqueous mixture to 45°–50° C. (113° F.–122° F.).

Lipid portion

Heat the combined fats to 60° C. (140° F.) and hold at this temperature for 15 minutes.

In a small portion of the heated fats, melt the emulsifiers, bring the temperature to 80° C.(176° F.) and add back to the main portion of the fats.

Add fat soluble flavors and or colors

Cool the fat phase to 45°–50° C.(113° F.–122° F.).

Emulsification and crystallization

Add the aqueous portion to the lipid portion gradually under controlled mixing so as to obtain a uniform crude w/o emulsion, maintain a minimum temperature of 40° C.(104° F.).

Pass through a scraped surface chilling unit with an exit temperature of −15° C.(59° F.).

TABLE 14

| Aqueous Portion | |
|---|---|
| Aqueous Portion | |
| % FAT | 40% |
| Ingredients | % |
| Avicel® RC591F cellulose gum | 0.8 |
| Xanthan gum | 0.08 |
| Salt | 0.50 |
| Potassium sorbate | 0.2 |
| Water to 100 % | to 100% |
| Color and flavor | to suit |

TABLE 15

| Lipid Portion | | |
|---|---|---|
| Lipid Portion | | |
| % Fat | 40 | 40 |
| Ingredients | % | % |
| Soya oil | 20 | 20 |
| Hydrogenated Soya Oil | 11.64 | 11.64 |
| Refined Palm Oil | 7.9 | 6.50 |

TABLE 15-continued

| Lipid Portion | | |
|---|---|---|
| Distilled monoglyceride | 0.35 | 0.00 |
| Composite | 0.00 | 1.75 |
| Flavor | to suit | to suit |

Preferred ingredients:

Avicel®RC591 cellulose gum. Avicel is a trademark of FMC Corporation

Composite a 80/20 w/w microcrystalline cellulose/Dimodan mono and diglycerides, a product of Grinsted Products, which has an HLB of 3.0.

EXAMPLE 24

Lowfat Frozen Desert

Prepare a lowfat frozen desert as follows:
Dairy mix procedure:
1. Assemble all liquid ingredients (cream, whole milk, condensed skim milk, liquid sweeteners) in a vat, then heat with agitation.
2. Dry blend powdered sweeteners, stabilizers, and emulsifiers. Add slowly to the liquid ingredients under good agitation. Mix 30 minutes to allow for dispersion and hydration of ingredients.
3. Pasteurize the mixture.
4. Homogenize the mixture, using a two stage pasteurizer, at 2,000 pounds per square inch (first stage) and 500 pounds per square inch (second stage).
5. Cool the mixture rapidly to 5° C. (40° F.). Age and mix overnight, if desired.
6. Freeze the mixture to an appropriate draw temperature, usually between (19° F. and 22° F.), pack the mixture in containers, and place it in a hardening room.

TABLE 16

| | Low Fat Frozen Desert | |
|---|---|---|
| Ingredients | % Solids | % Solids |
| Butterfat | 4.00 | 4.00 |
| Milk solids nonfat | 12.50 | 12.50 |
| Sucrose | 11.00 | 11.00 |
| Corn Syrup Solids | 5.00 | 4.30 |
| Avicel ® RC5811 cellulose gel | 0.40 | 0.40 |
| Composite | 0.00 | 1.00 |
| Cellulose gum | 0.10 | 0.10 |
| Carrageenan | 0.01 | 0.01 |
| Emulsifier | 0.30 | 0.00 |
| Total Solids | 33.31 | 33.31 |

Preferred ingredients:

Composite is a particle with a median size of approximately 15 to 20 micron that is an 80/20 w/w Avicel FD008 microcrystalline cellulose, a product of FMC corporation/Tandem 100 K a blend of mono and diglycerides and polysorbate 80, a product of Witco Corporation.

*EXAMPLE 25

Preparation of a Coprocessed Cellulose/Surfactant Ingredient

Avicel®FD 006 microcrystalline cellulose, a product of FMC Corporation, has an average particle size within the range of 5 to 10 microns. In a Gifford Woods Colloid Mill heated to about 93.3° C. (200° F.) by boiling water is placed about 11.3 Kg of deionized water. The mill we operated at a rheostat setting of 70% (approximately 5000 RPM) and a 40.5 mil clearance to disperse 1846.15 grams of FD 006 in the water. To aid mixing a Lightnin mixer was also inserted into the mill hopper. Milling continued for about 10 to 15 minutes to fully disperse the FD 006 cellulose. During the dispersion, 200 g of Polysorbate 60 (Tween® 60) was melted to about 60° C. (140° F.). Upon completion of the milling operation, the molten polysorbate was added to the dispersed FD 006 in the colloid mill hopper at a reduced rheostat setting of 50% to minimize foaming, during which the temperature was maintained at about 71.1° C. (160° F.) to keep the temperature above the melting point of the surfactant. The mixture was then homogenized at about 60° C. (140° F.) using a Manton-Gaulin homogenizer set at 3000 pounds per square inch (2500 psi first stage, 500 psi second stage). The homogenized mixture was then pumped at 60° C. (140° F.) by a Moyno pump at setting #2 from a holding tank to the spray head of a two-fluid nozzle atomizer located in a Stork Bowen 3 foot diameter spray dryer. The material was atomized at 90 psi air pressure using a 2.54 mm (0.1 inch) nozzle and then dried at 150° C. inlet temperature and 80° C. outlet temperature. The product was dried to about 2–4% moisture and is screened through a U.S. 60 mesh screen to produce a fine, free flowing powder. This procedure was used for all examples of coprocessed microcrystalline cellulose reported herein except that shown in Example 2.

*EXAMPLE 26

Preparation of Coprocessed Cellulose/Sucrose Ester Surfactant Ingredient

Avicel® FD 006 was dispersed as in Example 1. A monostearate ester of sucrose (S570) from Mitsubishi-Kasei Food. Co. was melted at 71.1° C. (160° F.) and small quantities of hot (82.2°–93.3° C. (180°–200° F.)) deionized water sufficient to prepare a slurry added. The amount of water was equal in volume to the surfactant, and the slurry resembled a semi-solid carrageenan or pectin gel. This slurry was added very slowly to the dispersion of microcrystalline cellulose in deionized water which was maintained at 82.2°–93.3° C. (180°–200° F.) during the addition. The remainder of the processing was the same as described in Example 2.5.

EXAMPLE 27 (a–o)

Batch Preparation of Dark Chocolate Having a Fat Content Of ~27% Using Coprocessed Microcrystalline Cellulose/Suffactant Ingredients In a Brabender Prep Center Sigma® mixer heated to 56° C. (132.8° F.) was placed 208.70 grams of chocolate liquor (West African, medium roast (#1 natural process) from Wilbur Chocolate Co.) and 215.00 grams of premilled sugar (approximately 4× from Wilbur Chocolate Co.). This combination was mixed for 15 minutes at 75 rpm after which 50.60 grams of coprocessed microcrystalline cellulose/surfactant was added and mixing continued until a uniform mixture was obtained. In some cases it was necessary to add a small portion of cocoa butter and/or lecithin to improve the mixing. This mixture was then milled twice on a Day 5"×12", 3-roll refiner with the rolls adjusted to deliver a mass having a uniform particle size of 20 microns. The mixture was then returned to the Brabender Sigma Mixer heated to 73.3° C. (163.9° F.) and operating at 25 rpm. A small amount of cocoa butter added at this time to facilitate mixing. The dry conch period began when small dough balls appeared in the mixture and then continued for two hours. Wet conch began at the conclusion of this two hour period in the same mixer. The speed was set at 45–50 rpm, and a predispersion of 2.50 grams of lecithin in 23.30 grams of cocoa butter was added to the mixture. The amounts of cocoa butter and lecithin were reduced by any amount that had been introduced into the mixture during mixing or the dry conch step. After mixing was completed, the speed of the mixer was maintained at approximately 20–45 rpm at which time the wet conch began and then continued for a period of two hours. At the conclusion of the conching the mass was removed from the Brabender Sigma Mixer. When the chocolate reaches a temperature of 48.9° C. (120° F.), two-thirds of the chocolate was poured onto a marble table for tempering. During this step a thin layer (approximately 6–7 mm thick) of chocolate was worked back and forth to crystallize the cocoa butter. When the tempered chocolate cooled to 28.9°– 30° C. (about 84°–86° F.), it was mixed vigorously with the remainder of the chocolate mixture that had not been tempered. The final temperature of the entire mixture is 32.3°–33.3° C. (about 90°–92° F.). At this point the chocolate was poured into molds which were tapped to remove air bubbles. The molded chocolate was cooled quickly to 18.3° C. (65° F.) and then stored at 21.1° C. (70° F.) and 50% relative humidity until it was evaluated. The following coprocessed microcrystalline cellulose/surfactant materials, all containing 90% FD 006 microcrystalline cellulose and 10% of the identified surfactant, were formulated using the above procedure. They were evaluated for viscosity yield value using a rotational Fann® rheometer, and calculations of the values according to the Casson model were made using Haake VT-500 software. The surfactant coprocessed with FD 006 microcrystalline cellulose, sensory evaluations and the calculated values of the viscosity and yield value are shown for each formulation below:

3a Triodan® R-90, polyglycerol polyricinoleate from Grindsted Products Inc. Viscosity=5.57 Pa.s; yield value=16.57 Pa.
3b Triodan® 55, Grindsted Products Inc. Viscosity=2.57 Pa.s; yield value=163.09 Pa.
3c Span® 65, sorbitan tristearate from ICI Surfactants. Viscosity=2.92 Pa.s; yield value=114.68 Pa.
3d Polycon® S-80, sorbitan monooleate from Witco, Corp. Viscosity=3.05 Pa.s; yield value=109.75 Pa.
3e Synthetic lecithin YN from Palsgaard Industrie A/S. Viscosity=2.20 Pa.s; yield value=84.17 Pa.
3f Emphos™ D7030, phosphated mono, diglycerides from Witco, Corp. Viscosity=2.05 Pa.s; yield value=85.46 Pa
3g Panodan®, diacetyl tartaric esters of monoglycerides from Grindsted Products Inc. Viscosity=2.57 Pa.s; yield value=150.10 Pa.
3h S570, sucrose monostearate from Mitsubishi-Kasei Food. Co. Viscosity=2.01 Pa.s; yield value=14.69 Pa.
3i Myverol® P-06, distilled propylene glycol monoesters from Eastman Chemical Co. Viscosity=3.39 Pa.s; yield value=109.50 Pa.
3j Atmul® 2622K, lactylated monoglycerides from Witco Co. Viscosity =4.32 Pa.s; yield value=119.60 Pa.
3k Atmul® 84K, mono, diglycerides from Witco Corp. Viscosity=2.17 Pa.s; yield value=231.70 Pa.
3l Dimul® DDMK, distilled monoglycerides from Witco Corp. Viscosity =2.96 Pa.s; yield value=275.60 Pa.
Myverol® SMG, succinylated mono, diglycerides from Eastman Chemical Co. Viscosity=0.99 Pa.s; yield value= 291.00 Pa.
3n Myvacet® 9-45, distilled acetylated monoglycerides from Eastman Chemical Co. Viscosity=3.15 Pa.s; yield value=251.00 Pa.
3o Tween® 60, sorbitan monostearate from Surfactants. Viscosity and yield value are too high to measure.

Sensory Evaluation of Dark Chocolates

Samples of the dark chocolate made by the above method with coprocessed compositions prepared by the methods of Examples 1 and 2 are evaluated by an experienced individual for taste and texture. The control being used for comparison has 32% fat and contains no microcrystalline cellulose or microcrystalline cellulose coprocessed with a surfactant. The results of this evaluation are shown in Table 1, "#" denoting the corresponding example:

TABLE 17

| | Effect of additives in dark chocolate | |
|---|---|---|
| 3a | Triodan ® R-90 | Good melt, slightly better than control; flavor almost the same as the control |
| 3b | Triodan ® R-55 | Melt is very good, slightly "cleggy"; satisfactory flavor |
| 3c | Span ® 55 | Melt is very good, slightly "cleggy"; satisfactory flavor |
| 3d | Polycon ® S-80 | Melt is good, very slightly "cleggy"; flavor slightly worse than the control |
| 3e | YN lecithin | Melt is good, very slightly "cleggy"; good flavor |
| 3f | Emphos ™ D7030 | Melt equal to the control; very good flavor |
| 3g | Panodan ® 150K | Melt is "cleggy", sticking to mouth; satisfactory flavor |
| 3h | S570 | Excellent melt; good snap; excellent flavor |
| 3i | Myverol ® P-06 | Melt is good, very slightly "cleggy"; satisfactory flavor |
| 3j | Atmul ® 2622K | Melt is good, very slightly "cleggy"; satisfactory flavor |
| 3k | Atmul ® 84K | Melt is very good, slightly "cleggy"; satisfactory flavor, but slightly chalky |
| 3l | Dimul ® DDMK | Melt is fairly good; flavor is satisfactory |
| 3m | Myverol ® SMG | Melt is fair, slightly "cleggy"; satisfactory flavor, but with a slightly sharp taste |
| 3n | Myvacet ® 9-45 | Melt is fair, slightly "cleggy"; satisfactory flavor, but with a slightly off taste |
| 3o | Tween ® 60 | Melt is "cleggy"; flavor is slightly off and tastes chalky |

EXAMPLE 28 (a–d)

Batch Preparation Of Dark Chocolate Having a Fat Content of ~27% Comparing Various Methods of Reducing the Fat Content By the method of EXAMPLE 27 four formulations of reduced fat (~27%) chocolate were prepared and evaluated for viscosity and yield value. Table 18 shows the formulations and the calculated values.

TABLE 18

| Ingredients | Formulation | | | |
|---|---|---|---|---|
| | *4a grams | *4b grams | *4c grams | *4d grams |
| Chocolate liquor | 224.90 | 208.70 | 208.70 | 208.70 |
| Sugar | 252.60 | 215.00 | 215.00 | 215.00 |
| Cocoa butter | 14.95 | 28.25 | 23.20 | 23.20 |
| YN[a] | 2.53 | | | 2.53 |
| Admul ® WOL[b] | 2.53 | | | 2.53 |
| FD 006 cellulose | | 45.55 | | 45.54 |
| FD 006/YN[c] | | | 25.30 | |
| FD 006/Amul WOL[d] | | | 25.30 | |
| Lecithin | 2.50 | 2.50 | 2.50 | 2.50 |
| Viscosity | 3.29 Pa | 3.83 Pa | 5.46 Pa | 3.45 Pa |
| Yield value | 13.4 Pa·s | 108.70 Pa·s | 27.14 Pa·s | 9.11 Pa·s |

[a]Synthetic lecithin from Palsgaard Industrie A/S.
[b]Polyglycerol polyricinoleate from Quest
[c]Coprocessed 90% FD 006 with 10% YN synthetic lecithin
[d]Coprocessed 90% FD 006 with 10% Admul WOL

EXAMPLE 29 (a–e)

Continuous Preparation of Dark Chocolate Full and Reduced Fat Formulations

In a 6 liter Sigma/Z mixer heated to 54.4° C. (130° F.) were mixed at 45 rpm the chocolate liquor, sugar, microcrystalline cellulose (if included in the formulation), and a portion of the cocoa butter. Mixing requires about 5–8 minutes. The dough mix was refined on a Day 5"×12", 3-roll refiner with the rolls adjusted to reduce the particle size to a uniform minimum size of 20 microns. Conching was carried out in two Teledyne-Readco Continuous Processors placed in series. Both units have 2" flat elements set at 90° to produce maximum shear. The running speed of these units is 200 rpm with a weir/slide plate set at an opening of 6.35 mm (0.25 inch). The first unit was set up for dry conching, and the second unit for wet conching. Both units were heated at 71.1° C. (160° F.). Residence time in each unit was approximately 5–8 minutes, and the temperature during this time was not allowed to exceed 87.8° C. (190° F.). The tempering and molding procedures described in Example 27 were followed. The specific formulations follow in Table 19.

and a portion of the cocoa butter. The dry ingredients are premixed before being placed in the Sigma/Z mixer. Mixing requires about 5–20 minutes. The dough mix is refined on a Day 5"12", 3-roll refiner with the rolls adjusted to reduce the particle size to a uniform minimum size of 20 microns. The temperature during mixing and refining is maintained below 60° C. (140° F.) to prevent release of the water of crystallization from the lactose in the milk powder. Conching is carried out in two Teledyne-Readco Continuous Processors placed in series. Both units have 2" flat elements set at 90° to produce maximum shear. The running speed of the first unit is 271 rpm and the second unit is operated at 311 rpm with a weir/slide plate set at an opening of 7.94 mm (0.3125 inch). The first unit is set up for dry conching, and the second unit for wet conching. Both units are operated at 37.8°–48.9° C. (100°–120° F.). Residence time in each unit is approximately 5–8 minutes, and the product temperature during this time is not allowed to exceed 65.6° C. (150° F.). The tempering and molding procedures described in Example 3 are followed except that the temperature at which tempering is complete is 27.8° C. (82° F.), and the final temperature after mixing the tempered chocolate with the one-third that is not tempered is 30° C. (86° F.). The specific formulations follow in Table 20.

TABLE 19

| Ingredients | Formulation | | | | |
|---|---|---|---|---|---|
| | 19a kilograms | 19b kilograms | 19c kilograms | 19d kilograms | 19e kilograms |
| Chocolate liquor | 2.413 | 2.304 | 2.304 | 2.191 | 2.191 |
| Sugar, 4X | 2.713 | 2.486 | 2.486 | 2.259 | 2.259 |
| Cocoa butter | 0.463 | 0.517 | 0.417 | 0.572 | 0.476 |
| FD 006 | 0.000 | 0.281 | 0.281 | 0.558 | 0.558 |
| Lecithin | 0.028 | 0.028 | 0.028 | 0.028 | 0.028 |
| Percent fat | 32.0 | 30.2 | 30.0 | 30.2 | 29.5 |
| Viscosity | 1.52 Pa·s | 1.05 Pa·s | 1.55 Pa·s | 1.49 Pa·s | 2.25 Pa·s |
| Yield value | 24.81 Pa | 14.83 Pa | 22.03 Pa | 13.29 Pa | 20.58 Pa |

EXAMPLE 30 (a–e)

Continuous Preparation of Milk Chocolate Full and Reduced Fat Formulations

In a 6 liter Sigma/Z mixer heated to 54.4° C. (130° F.) are mixed at 45 rpm the chocolate liquor, milk powder, sugar, microcrystalline cellulose (if included in the formulation),

TABLE 20

| Ingredients | Formulation | | | | |
|---|---|---|---|---|---|
| | 30a kilograms | 30b kilograms | 30c kilograms | 30d kilograms | 30e kilograms |
| Chocolate liquor | 0.599 | 0.544 | 0.544 | 0.490 | 0.490 |
| Sugar, 4X | 2.640 | 2.558 | 2.558 | 2.449 | 2.449 |
| Milk Powder | 1.034 | 0.871 | 0.871 | 0.735 | 0.735 |
| Cocoa butter | 1.143 | 1.170 | 0.925 | 1.197 | 0.767 |
| FD 006 | 0.000 | 0.272 | 0.281 | 0.544 | 0.544 |
| Lecithin | 0.027 | 0.027 | 0.027 | 0.027 | 0.027 |
| Percent fat | 30.4 | 30.0 | 28.1 | 30.0 | 28.3 |
| Viscosity | 2.28 Pa·s | — | 3.47 Pa·s | — | 2.69 Pa·s |
| Yield value | 22.20 Pa | — | 44.84 Pa | — | 39.36 Pa |

EXAMPLE 31 (a–f)

Batch Preparation Of Dark Chocolate Having a Fat Content of ~27% and Reduced Calorie Content by Replacing Sugar with Lower Calorie Ingredients The procedure of Example 27 is followed in the batch preparation of the dark chocolate formulations having reduced calorie content by replacing sugar with lower calorie sweeteners. The only exception is that when Aspartame®, a product of G. D. Searle, is used it is added one hour before the conching is finished. The formulations are shown in Table 21.

TABLE 21

| Ingredient | Formulation | | | | | |
|---|---|---|---|---|---|---|
| | 31a grams | 31b grams | 31c grams | 31d grams | 31e grams | 31f grams |
| Chocolate liquor | 208.7 | 208.7 | 208.7 | 208.7 | 208.7 | 208.7 |
| Maltitol | 215.0 | | | 175.0 | | |
| Lactitol | | 145.0 | | | 214.5 | |
| Mannitol | | | 130.0 | | | |
| Xylitol | | 70.0 | 85.0 | 40.0 | | |
| Isomalt | | | | | | 214.5 |
| Cocoa butter | 23.2 | 23.2 | 23.2 | 23.2 | 23.2 | 23.2 |
| MCC/Surfactant | 50.6 | 50.6 | 50.6 | 50.6 | 50.6 | 50.6 |
| Lecithin | 2.5 | 2.5 | 2.5 | 2.5 | 2.5 | 2.5 |
| Aspartame ® | | | | | 0.5 | |
| Acesulfame K ® | | | | | | 0.5 |

EXAMPLE 32 (a–f)

Batch Preparation of Dark Chocolate Having a Fat Content of ~27% and Reduced Calorie Content by Replacing Sugar with Lower Calorie Ingredients The procedure of Example 27 is followed in the batch preparation of the dark chocolate formulations having reduced calorie content by replacing sugar with additional lower calorie sweeteners. The only exception is that Aspartame®, a product of G. D. Searle, is added one hour before the conching is finished. These formulations are shown in Table 22.

TABLE 22

| Ingredients | Formulation | | | | | |
|---|---|---|---|---|---|---|
| | 32a grams | 32b grams | 32c grams | 32d grams | 32e grams | 32f grams |
| Chocolate liquor | 208.7 | 208.7 | 208.7 | 208.7 | 208.7 | 208.7 |
| Maltitol | 104.5 | 104.5 | | | 94.5 | 94.5 |
| Lactitol | | | 94.5 | | | |
| Sorbitol | | | | 94.5 | | |
| Raftiline ® | 110.0 | 110.0 | | | | |
| Litesse ® | | | 120.0 | 120.0 | 120.0 | 120.0 |
| Cocoa butter | 23.2 | 23.2 | 23.2 | 23.2 | 23.2 | 23.2 |
| MCC/Surfactant | 50.6 | 50.6 | 50.6 | 50.6 | 50.6 | 50.6 |
| Lecithin | 2.5 | 2.5 | 2.5 | 2.5 | 2.5 | 2.5 |
| Aspartame ® | 0.5 | | 0.5 | 0.5 | 0.5 | |
| Acesulfame K ® | | 0.5 | | | | 0.5 |

EXAMPLE 33 (a–d)

Batch Preparation of Dark Chocolate Having a Fat Content of ~27% and Reduced Calorie Content by Replacing Cocoa Butter with Lower Calorie Ingredients The procedure of Example 27 is used to prepare the dark chocolate formulations, replacing cocoa butter with fat substitutes having lower calorie content or alternate calorie metabolism with the following modifications. One exception is that the tempering process is modified to account for the presence of the fat substitutes The other exception is that Aspartame®, a product of G. D. Searle, is added one hour before the conching is finished. These formulations are shown in Table 23.

TABLE 23

| Ingredients | Formulation | | | |
|---|---|---|---|---|
| | 33a grams | 33b grams | 33c grams | 33d grams |
| Chocolate liquor | 42.0 | 42.0 | 42.0 | 42.0 |
| Caprenin ® | 100.0 | | 100.0 | |
| MCT(M5/C10) | | 100.0 | | 100.0 |
| Maltitol | 94.5 | 94.5 | 104.5 | 104.5 |
| Lactitol | | | | |
| Raftiline ® | | | 110.0 | 110.0 |
| Litesse ® | 120.0 | 120.0 | | |
| Cocoa powder | 90.0 | 90.0 | 90.0 | 90.0 |
| MCC/Surfactant | 50.5 | 50.5 | 50.5 | 50.5 |

TABLE 23-continued

| Ingredients | Formulation | | | |
|---|---|---|---|---|
| | 33a grams | 33b grams | 33c grams | 33d grams |
| Lecithin | 2.5 | 2.5 | 2.5 | 2.5 |
| Aspartame ® | 0.5 | 0.5 | 0.5 | 0.5 |

EXAMPLE 34 (a–b)

Batch Preparation Of Revese Phase Crisp, Dark Chocolate

In a 1200 mL beaker 375.6 grams of sugar is dissolved in 75.1 grams of water with heating to the boiling point. When all of the sugar is dissolved, 93.9 grams of 42DE corn syrup is added, and this is followed in succession by 4.70 grams of lecithin, 375.6 grams of chocolate liquor, and 75.1 grams of cocoa butter. This mixture is emulsified using a Silverson turbine mixer. After emulsification and, if necessary, homogenization, the mixture is poured into a shallow tray and dried under a vacuum of 635–771 mm (25–28 inches) of mercury at a platent temperature of 71.1°–76.7° C. (160°–170° F.) until the moisture content of the product is less than 3%. The product is then cut into smaller pieces to be consumed. The formulations of reverse phase, crisp, dark chocolate are shown in Table 24.

TABLE 24

| Ingredients | Formulation | |
|---|---|---|
| | *11a grams | 11b grams |
| Chocolate liquor | 375.6 | 375.6 |
| Sugar | 375.6 | 375.6 |
| 42DE Corn Syrup | 93.9 | 93.9 |
| Cocoa butter | 75.1 | |
| Lecithin | 4.7 | 4.7 |
| MCC/Surfactant | | 75.1 |
| Water | 75.1 | 75.1 |
| Fat content | 27% | 20% |

EXAMPLE 35 (a–b)

Batch Preparation Of Reverse Phase, Crisp, Milk Chocolate

In a large vessel is placed 750 grams of sweetened condensed milk heated to 60° C. (140° F.), and to this are added with mixing 105 grams of chocolate liquor, 90 grams of cocoa butter, 45 grams of 42DE corn syrup, and 3.75 grams of lecithin. After being mixed completely, the mixture is emulsified with a Silverson turbine mixer, After emulsification and, if necessary, homogenization, the mixture is poured into a shallow tray and dried under a vacuum of 635–771 mm (25–28 inches) of mercury at a platent temperature of 71.1°–76.7° C. (160°–170° F.) until the moisture content of the product is less than 3%. The foamed product is then cut into smaller pieces to be consumed. The formulations of reverse phase, crisp, milk chocolate are shown in Table 25

TABLE 25

| Ingredients | Formulation | |
|---|---|---|
| | 35a grams | 35b grams |
| Chocolate liquor | 105.0 | 105.0 |
| Sweetened condensed milk | 750.0 | 750.0 |
| 42DE Corn syrup | 45.0 | 45.0 |
| Cocoa butter | 90.0 | |
| Lecithin | 3.75 | 3.75 |
| MCC/Surfactant | | 90.0 |
| Fat content | 21% | 13% |

EXAMPLE 36

Batch Preparation Of White Chocolate Having a Fat Content of ~27% Using Coprocessed Microcrystalline Cellulose/Surfactant Ingredients In a Brabender Prep Center Sigma® mixer heated to 56° C. (132.8° F.) are placed 115 grams of milk powder and small amounts of cocoa butter and premilled sugar (approximately 4× from Wilbur Chocolate Co.). This combination is mixed for 15 minutes at 75 rpm after which a preblend of coprocessed F006 microcrystalline cellulose/S570 sucrose monostearate and the remaining sugar (total sugar amount= 237 grams) is added and mixing is continued until a uniform mixture is obtained. In some cases it is necessary to add a small portion of cocoa butter and/or lecithin to improve the mixing. This mixture is then milled twice on a Day 5"×12", 3-roll refiner with the rolls adjusted to deliver a mass having a uniform particle size of 20 microns. The mixture is then returned to the Brabender Sigma Mixer heated to 56° C. (132.8° F.) and operating at 25 rpm. A small amount of cocoa butter may be added at this time to facilitate mixing. The dry conch period begins when small dough balls appear in the mixture and continues for two hours. Wet conch begins at the conclusion of this two hour period in the same mixer. The speed is set at 45–50 rpm, and a predispersion of 2.50 grams of lecithin in cocoa butter and the remaining cocoa butter (total cocoa butter content=95 grams) is added to the mixture. The amounts of cocoa butter and lecithin are reduced by any amount that has been introduced into the mixture during mixing or the dry conch step. After mixing has been completed, the speed of the mixer is maintained at approximately 20–45 rpm at which time the wet conch begins and continues for a period of two hours. At the conclusion of the conching the mass is removed from the Brabender Sigma Mixer. When the chocolate reaches a temperature of 48.9° C. (120° F.), two-thirds of the chocolate is poured onto a marble table for tempering. During this step a thin layer (approximately 6–7 mm thick) of chocolate is worked back and forth to crystallize the cocoa butter. When the tempered chocolate cools to 26.7°–27.8° C. (about 80°–82° F.), it is mixed vigorously with the remainder of the chocolate mixture that has not been tempered. The final temperature of the entire mixture is 28.9°–30° C. (about 84°–86° F.). At this point the chocolate is poured into molds which are tapped to remove air bubbles. The molded chocolate is cooled quickly to 18.3° C. (65° F.) and then stored at 21.1° C. (70° F.) and 50% relative humidity until it is evaluated.

EXAMPLE 37 (a–b)

Batch Preparation Of Milk Crumb Containing Microcrystalline Cellulose Coprocessed with Surfactants In a Brabender Prep Center Sigma® mixer heated to 73° C. (163.4° F.) are placed 405.45 grams of sweetened condensed milk and 44.55 grams of molten chocolate liquor (West African, medium roast (#1 natural process) from Wilbur Chocolate Co.). The contents are then mixed for approximately 30 minutes while operating the mixer at 75 rpm. To this mixture is then added 50 grams of coprocessed F006 microcrystalline cellulose/S570 sucrose monostearate, and mixing is continued at 75 rpm for an additional 30 minutes. This mixture is then emulsified in a Silverson turbine mixer. Upon completion of the emulsification step, the mixture is poured into shallow trays and dried under a vacuum of 635–771 mm (25–28 inches) of mercury at a platent temperature of 71.1 ° C. (160° F.) until the moisture content of the product is between 1.5% and 3%. The crisp product may then be pulverized to a powder which subsequently may be used to prepare milk chocolate having reduced fat content by adding 49.3 grams of cocoa butter and 2.3 grams of lecithin to 448.4 grams of milk crumb and processing this mixture according to the method of Example 6. Two formulations of milk crumb containing coprocessed microcrystalline cellulose are shown in Table 26.

TABLE 26

| Ingredients | Formulation 14a grams | Formulation 14b grams |
|---|---|---|
| Chocolate liquor | 44.55 | 44.55 |
| Sweetened condensed milk | 405.45 | |
| Sweetened condensed skim milk | | 405.45 |
| MCC/Surfactant | 50.00 | 50.00 |

We claim:

1. A reduced calorie chocolate confection, comprising
   15 to 30 weight percent fat;
   3 to 30 weight % of a cellulose/surfactant composite; and
   0.5 to 50 weight % sweetener.
2. The reduced calorie chocolate confection of claim 1, wherein there is
   20 to 28% fat;
   10 to 30% composite;
   and wherein the sweetener is an alternate sweetener.
3. The reduced calorie chocolate confection of claim 2, wherein there is 24 to 27% fat;
   10 to 30% composite and the composite contains microcrystalline cellulose;
   and 0.5 to 40% alternate sweetener.
4. The reduced calorie chocolate of claim 2, wherein the total calories of the chocolate confection is within the range of from 180 to 415 calories per 100 grams of the confection.
5. The reduced calorie confection of claim 4, wherein the total calories of the chocolate confection is within the range of from 180 to 220 calories per 100 grams of the confection.
6. A reduced calorie chocolate confection having a fat, a hydrophobic composite of a microcrystalline cellulose/surfactant and a sweetener, the reduced calorie chocolate confection having from 180 to 220 calories per 100 grams.
7. A chocolate crumb containing hydrophobic composite of cellulose coprocessed with a surfactant, as a fat replacement.
8. A reverse phase chocolate containing a hydrophobic composite of a coprocessed cellulose/surfactant.

* * * * *